US011516032B2

(12) United States Patent
Jorge

(10) Patent No.: US 11,516,032 B2
(45) Date of Patent: Nov. 29, 2022

(54) METHODS AND SYSTEMS FOR BILLING OF METADATA IN A NETWORK OF MOVING THINGS

(71) Applicant: Veniam, Inc., Mountain View, CA (US)

(72) Inventor: Clinton Luís Jorge, Madeira (PT)

(73) Assignee: VENIAM, INC., Mountain View, CA (US)

( * ) Notice: Subject to any disclaimer, the term of this patent is extended or adjusted under 35 U.S.C. 154(b) by 0 days.

(21) Appl. No.: 17/106,430

(22) Filed: Nov. 30, 2020

(65) Prior Publication Data

US 2021/0167978 A1 Jun. 3, 2021

Related U.S. Application Data

(60) Provisional application No. 62/942,231, filed on Dec. 2, 2019.

(51) Int. Cl.
*H04L 9/40* (2022.01)
*H04L 12/14* (2006.01)

(52) U.S. Cl.
CPC ...... *H04L 12/1403* (2013.01); *H04L 12/1432* (2013.01)

(58) Field of Classification Search
CPC ... H04L 12/14; H04L 12/1407; H04L 12/141; H04W 4/21; H04W 4/024; H04W 4/021; H04W 4/025; H04W 4/06
See application file for complete search history.

(56) References Cited

U.S. PATENT DOCUMENTS

| | | | | |
|---|---|---|---|---|
| 2002/0129358 A1* | 9/2002 | Buehl | ............... | H04N 21/84 725/1 |
| 2005/0091157 A1* | 4/2005 | Suzuki | ............... | G06Q 20/102 705/40 |
| 2010/0041365 A1* | 2/2010 | Lott | ............... | H04M 15/68 455/406 |
| 2010/0260100 A1* | 10/2010 | Kerr | ............... | H04L 47/2433 370/328 |
| 2014/0024340 A1* | 1/2014 | Raleigh | ............... | H04M 15/28 455/406 |
| 2014/0358750 A1* | 12/2014 | Hively | ............... | G06Q 20/102 705/34 |
| 2015/0370922 A1* | 12/2015 | Helfman | ............... | G06Q 20/14 705/40 |
| 2017/0206529 A1* | 7/2017 | Raleigh | ............... | G06Q 20/0855 |

* cited by examiner

*Primary Examiner* — Abdelnabi O Musa
(74) *Attorney, Agent, or Firm* — McAndrews, Held & Malloy, Ltd.

(57) ABSTRACT

Systems and methods are provided for billing of metadata in a network of moving things.

24 Claims, 19 Drawing Sheets

METHODS AND SYSTEMS FOR BILLING OF METADATA IN A NETWORK OF MOVING THINGS

CLAIM OF PRIORITY

This patent application claims priority to and benefit from U.S. Provisional Patent Application Ser. No. 62/942,231, filed Dec. 2, 2019. The above identified application is hereby incorporated herein by reference in its entirety.

CROSS-REFERENCE TO RELATED APPLICATIONS/INCORPORATION BY REFERENCE

This patent application is related to:
U.S. Provisional Patent Application Ser. No. 62/221,997, titled "Integrated Communication Network for a Network of Moving Things," filed Sep. 22, 2015;
U.S. Provisional Patent Application Ser. No. 62/222,016, titled "Systems and Methods for Synchronizing a Network of Moving Things," filed Sep. 22, 2015;
U.S. Provisional Patent Application Ser. No. 62/222,042, titled "Systems and Methods for Managing a Network of Moving Things," filed Sep. 22, 2015;
U.S. Provisional Patent Application Ser. No. 62/222,066, titled "Systems and Methods for Monitoring a Network of Moving Things," filed Sep. 22, 2015;
U.S. Provisional Patent Application Ser. No. 62/222,077, titled "Systems and Methods for Detecting and Classifying Anomalies in a Network of Moving Things," filed Sep. 22, 2015;
U.S. Provisional Patent Application Ser. No. 62/222,098, titled "Systems and Methods for Managing Mobility in a Network of Moving Things," filed Sep. 22, 2015;
U.S. Provisional Patent Application Ser. No. 62/222,121, titled "Systems and Methods for Managing Connectivity a Network of Moving Things," filed Sep. 22, 2015;
U.S. Provisional Patent Application Ser. No. 62/222,135, titled "Systems and Methods for Collecting Sensor Data in a Network of Moving Things," filed Sep. 22, 2015;
U.S. Provisional Patent Application Ser. No. 62/222,145, titled "Systems and Methods for Interfacing with a Network of Moving Things," filed Sep. 22, 2015;
U.S. Provisional Patent Application Ser. No. 62/222,150, titled "Systems and Methods for Interfacing with a User of a Network of Moving Things," filed Sep. 22, 2015;
U.S. Provisional Patent Application Ser. No. 62/222,168, titled "Systems and Methods for Data Storage and Processing for a Network of Moving Things," filed Sep. 22, 2015;
U.S. Provisional Patent Application Ser. No. 62/222,183, titled "Systems and Methods for Vehicle Traffic Management in a Network of Moving Things," filed Sep. 22, 2015;
U.S. Provisional Patent Application Ser. No. 62/222,186, titled "Systems and Methods for Environmental Management in a Network of Moving Things," filed Sep. 22, 2015;
U.S. Provisional Patent Application Ser. No. 62/222,190, titled "Systems and Methods for Port Management in a Network of Moving Things," filed Sep. 22, 2015;
U.S. Provisional Patent Application Ser. No. 62/222,192, titled "Communication Network of Moving Things," filed Sep. 22, 2015;
U.S. Provisional Patent Application Ser. No. 62/244,828, titled "Utilizing Historical Data to Correct GPS Data in a Network of Moving Things," filed Oct. 22, 2015;
U.S. Provisional Patent Application Ser. No. 62/244,930, titled "Using Anchors to Correct GPS Data in a Network of Moving Things," filed Oct. 22, 2015;
U.S. Provisional Patent Application Ser. No. 62/246,368, titled "Systems and Methods for Inter-Application Communication in a Network of Moving Things," filed Oct. 26, 2015;
U.S. Provisional Patent Application Ser. No. 62/246,372, titled "Systems and Methods for Probing and Validating Communication in a Network of Moving Things," filed Oct. 26, 2015;
U.S. Provisional Patent Application Ser. No. 62/250,544, titled "Adaptive Rate Control for Vehicular Networks," filed Nov. 4, 2015;
U.S. Provisional Patent Application Ser. No. 62/273,878, titled "Systems and Methods for Reconfiguring and Adapting Hardware in a Network of Moving Things," filed Dec. 31, 2015;
U.S. Provisional Patent Application Ser. No. 62/253,249, titled "Systems and Methods for Optimizing Data Gathering in a Network of Moving Things," filed Nov. 10, 2015;
U.S. Provisional Patent Application Ser. No. 62/257,421, titled "Systems and Methods for Delay Tolerant Networking in a Network of Moving Things," filed Nov. 19, 2015;
U.S. Provisional Patent Application Ser. No. 62/265,267, titled "Systems and Methods for Improving Coverage and Throughput of Mobile Access Points in a Network of Moving Things," filed Dec. 9, 2015;
U.S. Provisional Patent Application Ser. No. 62/270,858, titled "Channel Coordination in a Network of Moving Things," filed Dec. 22, 2015;
U.S. Provisional Patent Application Ser. No. 62/257,854, titled "Systems and Methods for Network Coded Mesh Networking in a Network of Moving Things," filed Nov. 20, 2015;
U.S. Provisional Patent Application Ser. No. 62/260,749, titled "Systems and Methods for Improving Fixed Access Point Coverage in a Network of Moving Things," filed Nov. 30, 2015;
U.S. Provisional Patent Application Ser. No. 62/273,715, titled "Systems and Methods for Managing Mobility Controllers and Their Network Interactions in a Network of Moving Things," filed Dec. 31, 2015;
U.S. Provisional Patent Application Ser. No. 62/281,432, titled "Systems and Methods for Managing and Triggering Handovers of Mobile Access Points in a Network of Moving Things," filed Jan. 21, 2016;
U.S. Provisional Patent Application Ser. No. 62/268,188, titled "Captive Portal-related Control and Management in a Network of Moving Things," filed Dec. 16, 2015;
U.S. Provisional Patent Application Ser. No. 62/270,678, titled "Systems and Methods to Extrapolate High-Value Data from a Network of Moving Things," filed Dec. 22, 2015;
U.S. Provisional Patent Application Ser. No. 62/272,750, titled "Systems and Methods for Remote Software Update and Distribution in a Network of Moving Things," filed Dec. 30, 2015;
U.S. Provisional Patent Application Ser. No. 62/278,662, titled "Systems and Methods for Remote Configuration Update and Distribution in a Network of Moving Things," filed Jan. 14, 2016;
U.S. Provisional Patent Application Ser. No. 62/286,243, titled "Systems and Methods for Adapting a Network of Moving Things Based on User Feedback," filed Jan. 22, 2016;

U.S. Provisional Patent Application Ser. No. 62/278,764, titled "Systems and Methods to Guarantee Data Integrity When Building Data Analytics in a Network of Moving Things," Jan. 14, 2016;

U.S. Provisional Patent Application Ser. No. 62/286,515, titled "Systems and Methods for Self-Initialization and Automated Bootstrapping of Mobile Access Points in a Network of Moving Things," filed Jan. 25, 2016;

U.S. Provisional Patent Application Ser. No. 62/295,602, titled "Systems and Methods for Power Management in a Network of Moving Things," filed Feb. 16, 2016;

U.S. Provisional Patent Application Ser. No. 62/299,269, titled "Systems and Methods for Automating and Easing the Installation and Setup of the Infrastructure Supporting a Network of Moving Things," filed Feb. 24, 2016;

U.S. Provisional Patent Application Ser. No. 62/823,736, filed Mar. 26, 2019;

U.S. Provisional Patent Application Ser. No. 62/856,448, filed Jun. 3, 2019;

U.S. Provisional Patent Application Ser. No. 62/863,393, filed Jun. 19, 2019;

U.S. Provisional Patent Application Ser. No. 62/882,900, filed Aug. 5, 2019; and U.S. Provisional Patent Application Ser. No. 62/942,232, filed Dec. 2, 2019.

Each of the above identified applications is hereby incorporated herein by reference in its entirety for all purposes.

BACKGROUND

Current communication networks may be unable to adequately support communication environments involving static and mobile nodes, including, for example, autonomous vehicles. As a non-limiting example, current communication networks are unable to support adequately a network comprising a complex array of both moving and static nodes (e.g., the Internet of moving things, autonomous vehicle networks, etc.).

Limitations and disadvantages of conventional methods and systems will become apparent to one of skill in the art, through comparison of such approaches with some aspects of the present methods and systems set forth in the remainder of this disclosure with reference to the drawings.

BRIEF SUMMARY

Various aspects of this disclosure provide communication network architectures, systems and methods for supporting and/or effectively utilizing a network of mobile and/or static nodes. As a non-limiting example, various aspects of this disclosure provide communication network architectures, systems, and methods for supporting a dynamically configurable communication network comprising a complex array of both static and moving communication nodes (e.g., the Internet of moving things, autonomous vehicle networks, etc.). For example, a communication network implemented in accordance with various aspects of the present disclosure may operate in one of a plurality of modalities comprising various fixed nodes, mobile nodes, and/or a combination thereof, which are selectable to achieve any of a variety of system goals. In various example implementations in accordance with the present disclosure, such communication networks may be configured for supporting billing of metadata in a network of moving things.

DETAILED DESCRIPTION

Figure 1:
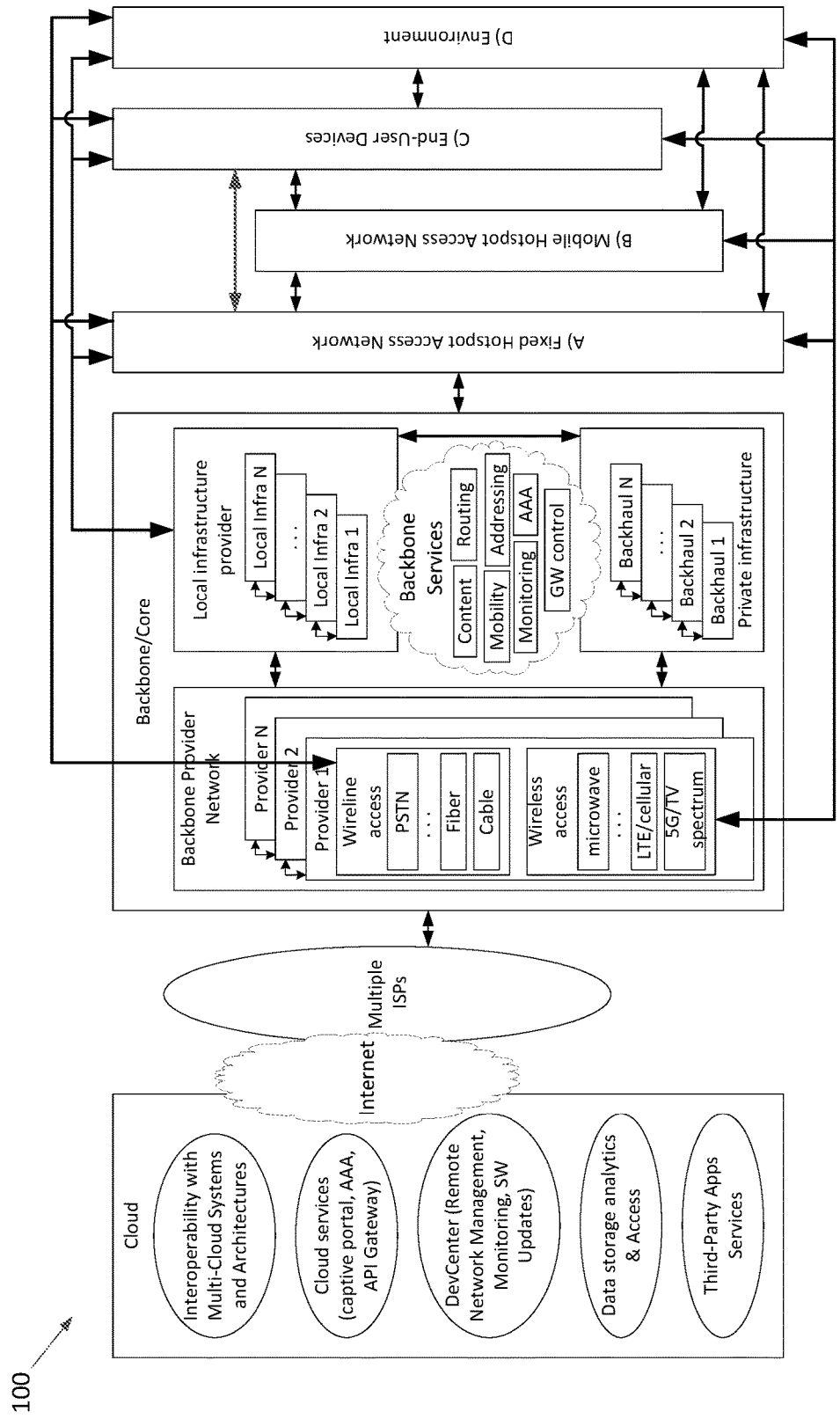
FIG. 1 shows a block diagram of a communication network, in accordance with various aspects of this disclosure.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry, for example, may operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module", for example, may refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g.," set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example an electronic device may be turned sideways so that its "top" surface is facing horizontally and its "side" surface is facing vertically, without departing from the teachings of the present disclosure.

With the proliferation of the mobile and/or static things (e.g., devices, machines, people, etc.) and logistics for such things to become connected to each other (e.g., in the contexts of smart logistics, transportation, environmental sensing, etc.), a platform that is for example always-on, robust, scalable and secure that is capable of providing connectivity, services and Internet access to such things (or objects), anywhere and anytime is desirable. Efficient power utilization within the various components of such system is also desirable.

Accordingly, various aspects of the present disclosure provide a fully-operable, always-on, responsive, robust, scalable, secure platform/system/architecture to provide connectivity, services and Internet access to all mobile things and/or static things (e.g., devices, machines, people, access points, end user devices, sensors, etc.) anywhere and anytime, while operating in an energy-efficient manner.

Various aspects of the present disclosure provide a platform that is flexibly configurable and adaptable to the various requirements, features, and needs of different environments, where each environment may be characterized by a respective level of mobility and density of mobile and/or static things, and the number and/or types of access to those things. Characteristics of various environments, for example, may include high mobility of nodes (e.g., causing contacts or connections to be volatile), high number of neighbors, high number of connected mobile users, mobile access points, availability of multiple networks and technologies (e.g., sometimes within a same area), etc. For example, the mode of operation of the platform may be flexibly adapted from environment to environment, based on each environment's respective requirements and needs, which may be different from other environments. Additionally for example, the platform may be flexibly optimized (e.g., at design/installation time and/or in real-time) for different purposes (e.g., to reduce the latency, increase throughput, reduce power consumption, load balance, increase reliability, make more robust with regard to failures or other disturbances, etc.), for example based on the content, service or data that the platform provides or handles within a particular environment.

In accordance with various aspects of the present disclosure, many control and management services (e.g., mobility, security, routing, etc.) are provided on top of the platform (e.g., directly, using control overlays, using containers, etc.), such services being compatible with the services currently deployed on top of the Internet or other communication network(s).

The communication network (or platform), in whole or in part, may for example be operated in public and/or private modes of operation, for example depending on the use case. The platform, for example, may operate in a public or private mode of operation, depending on the use-case (e.g., public Internet access, municipal environment sensing, fleet operation, etc.).

Additionally for example, in an implementation in which various network components are mobile, the transportation and/or signal control mechanisms may be adapted to serve the needs of the particular implementation. Also for example, wireless transmission power and/or rate may be adapted (e.g., to mitigate interference, to reduce power consumption, to extend the life of network components, etc.

Various example implementations of a platform, in accordance with various aspects of the present disclosure, are capable of connecting different subsystems, even when various other subsystems that may normally be utilized are unavailable. For example, the platform may comprise various built-in redundancies and fail-recovery mechanisms. For example, the platform may comprise a self-healing capability, self-configuration capability, self-adaptation capability, etc. The protocols and functions of the platform, for example, may be prepared to be autonomously and smoothly configured and adapted to the requirements and features of different environments characterized by different levels of mobility and density of things (or objects), the number/types of access to those things. For example, various aspects of the platform may gather context parameters that can influence any or all decisions. Such parameters, for example, may be derived locally, gathered from a neighborhood, fixed APs, the Cloud, etc. Various aspects of the platform also, for example, may ask for historical information to feed any of the decisions, where such information can be derived from historical data, from surveys, from simulators, etc. Various aspects of the platform additionally, for example, may probe or monitor decisions made throughout the network, for example to evaluate the network and/or the decisions themselves in real-time. Various aspects of the platform further, for example, may enforce the decisions in the network (e.g., after evaluating the probing results). Various aspects of the platform, for example, may establish thresholds to avoid any decision that is to be performed constantly or repeatedly without any significant advantage (e.g., technology change, certificate change, IP change, etc.). Various aspects of the platform also, for example, may learn locally (e.g., with the decisions performed) and dynamically update the decisions.

In addition to (or instead of) failure robustness, a platform may utilize multiple connections (or pathways) that exist between distinct sub-systems or elements within the same sub-system, to increase the robustness and/or load-balancing of the system.

The following discussion will present examples of the functionality performed by various example subsystems of the communication network. It should be understood that the example functionality discussed herein need not to be performed by the particular example subsystem or by a single subsystem. For example, the subsystems present herein may interact with each other, and data or control services may be deployed either in a centralized way, or by having their functionalities distributed among the different subsystems, for example leveraging the cooperation between the elements of each subsystem.

Various aspects of the present disclosure provide a communication network (e.g., a city-wide vehicular network, a shipping port-sized vehicular network, a campus-wide vehicular network, etc.) that utilizes vehicles (e.g., automobiles, buses, trucks, boats, forklifts, human-operated vehicles, autonomous and/or remote controlled vehicles, etc.) as Wi-Fi hotspots. Note that Wi-Fi is generally used throughout this discussion as an example, but the scope of various aspects of this disclosure is not limited thereto. For example, other wireless LAN technologies, PAN technologies, MAN technologies, etc., may be utilized. Such utilization, for example, may provide cost-effective ways to gather substantial amounts of urban data, and provide for the efficient offloading of traffic from congested cellular networks (or other networks). In controlled areas (e.g., ports, harbors, etc.) with many vehicles, a communication network in accordance with various aspects of this disclosure may expand the wireless coverage of existing enterprise Wi-Fi networks, for example providing for real-time communication with vehicle drivers (e.g., human, computer-controlled, etc.) and other mobile employees without the need for SIM cards or cellular (or other network) data plans.

Vehicles may have many advantageous characteristics that make them useful as Wi-Fi (or general wireless) hotspots. For example, vehicles generally have at least one battery, vehicles are generally densely spread over the city at street level and/or they are able to establish many contacts with each other in a controlled space, and vehicles can communicate with 10× the range of normal Wi-Fi in the 5.9 GHz frequency band, reserved for intelligent transportation systems in the EU, the U.S., and elsewhere. Note that the scope of this disclosure is not limited to such 5.9 GHz wireless communication. Further, vehicles are able to expand effectively their coverage area into a swath over a period of time, enabling a single vehicle access point to interact with substantially more data sources over the period of time.

In accordance with various aspects of the present disclosure, an affordable multi-network on-board unit (OBU) is presented. Note that the OBU may also be referred to herein as a mobile access point, mobile AP, MAP, etc. The OBU, for example, may comprise a plurality of networking interfaces (e.g., Wi-Fi, 802.11p, 4G, Bluetooth, UWB, etc.). The OBU, for example, may be readily installed in or on private and/or public vehicles (e.g., individual user vehicles, vehicles of private fleets, vehicles of public fleets, etc.). The OBU, for example, may be installed in transportation fleets, waste management fleets, law enforcement fleets, emergency services, road maintenance fleets, taxi fleets, aircraft fleets, etc. The OBU, for example, may be installed in or on a vehicle or other structure with free mobility or relatively limited mobility. The OBU also, for example, may be carried by a person or service animal, mounted to a bicycle, mounted to a moving machine in general, mounted to a container, etc.

The OBUs, for example, may operate to connect passing vehicles to the wired infrastructure of one or more network providers, telecom operators, etc. In accordance with the architecture, hardware, and software functionality discussed herein, vehicles and fleets can be connected not just to the cellular networks (or other wide area or metropolitan area networks, etc.) and existing Wi-Fi hotspots spread over a city or a controlled space, but also to other vehicles (e.g., utilizing multi-hop communications to a wired infrastructure, single or multi-hop peer-to-peer vehicle communication, etc.). The vehicles and/or fleets, for example, may form an overall mesh of communication links, for example including the OBUs and also fixed access points (APs) connected to the wired infrastructure (e.g., a local infrastructure, etc.). Note that OBUs herein may also be referred to as "mobile APs," "mobile hotspots," "MAPs," etc. Further, it should be noted that fixed access points may also be referred to herein as Road Side Units (RSUs), fixed APs (FAPs), etc.

In an example implementation, the OBUs may communicate with the fixed APs utilizing a relatively long-range protocol (e.g., 802.11p, etc.), and the fixed APs may, in turn, be hard wired to the wired infrastructure (e.g., via cable, tethered optical link, etc.). Note that fixed APs may also, or alternatively, be coupled to the infrastructure via wireless link (e.g., 802.11p, etc.). Additionally, clients or user devices may communicate with the OBUs using one or more relatively short-range protocols (e.g., Wi-Fi, Bluetooth, UWB, etc.). The OBUs, for example having a longer effective wireless communication range than typical Wi-Fi access points or other wireless LAN/PAN access points (e.g., at least for links such as those based on 802.11p, etc.), are capable of substantially greater coverage areas than typical Wi-Fi or other wireless LAN/PAN access points, and thus fewer OBUs are necessary to provide blanket coverage over a geographical area.

The OBU, for example, may comprise a robust vehicular networking module (e.g., a Wi-Fi connection manager) which builds on long-range communication protocol capability (e.g., 802.11p, etc.). For example, in addition to comprising 802.11p (or other long-range protocol) capability to communicate with fixed APs, vehicles, and other nodes in the network, the OBU may comprise a network interface (e.g., 802.11a/b/g/n, 802.11ac, 802.11af, any combination thereof, etc.) to provide wireless local area network (WLAN) connectivity to end user devices, sensors, fixed Wi-Fi access points, etc. For example, the OBU may operate to provide in-vehicle Wi-Fi Internet access to users in and/or around the vehicle (e.g., a bus, train car, taxi cab, public works vehicle, etc.). The OBU may further comprise one or more wireless backbone communication interfaces (e.g., cellular network interfaces, etc.). Though in various example scenarios, a cellular network interface (or other wireless backbone communication interface) might not be the preferred interface for various reasons (e.g., cost, power, bandwidth, etc.), the cellular network interface may be utilized to provide connectivity in geographical areas that are not presently supported by a fixed AP, may be utilized to provide a fail-over communication link, may be utilized for emergency communications, may be utilized to subscribe to local infrastructure access, etc. The cellular network interface also, for example, may be utilized to allow the deployment of solutions that are dependent on the cellular network operators.

An OBU, in accordance with various aspects of the present disclosure, may for example comprise a smart Wi-Fi connection manager that can select the best available wireless link(s) (e.g., Wi-Fi, 802.11p, cellular, vehicle mesh, etc.) with which to access the Internet. The OBU also, for example, may provide geo-location capabilities (e.g., GPS, etc.), motion detection sensors to determine if the vehicle is in motion, and a power control subsystem (e.g., to ensure that the OBU does not deplete the vehicle battery, etc.). The OBU, for example, may comprise any or all of the sensors (e.g., environmental sensors, etc.) discussed herein.

The OBU also, for example, may comprise a manager that manages machine-to-machine data acquisition and transfer (e.g., in a real-time or delay-tolerant fashion) to and from the Cloud. For example, the OBU may log and/or communicate information of the vehicles.

The OBU, for example, may comprise a connection and/or routing manager that operates to perform routing of communications in a vehicle-to-vehicle/vehicle-to-infrastructure multi-hop communication. A mobility manager (or controller, MC), for example, may ensure that communication sessions persist over one or more handoff(s) (also referred to herein as a "handover" or "handovers") (e.g., between different mobile APs, fixed APs, base stations, hot spots, etc.), among different technologies (e.g., 802.11p, cellular, Wi-Fi, satellite, etc.), among different MCs (e.g., in a fail-over scenario, load redistribution scenario, etc.), across different interfaces (or ports), etc. Note that the MC may also be referred to herein as a Local Mobility Anchor (LMA), a Network Controller, etc. Note that the MC, or a plurality thereof, may for example be implemented as part of the backbone, but may also, or alternatively, be implemented as part of any of a variety of components or combinations thereof. For example, the MC may be implemented in a fixed AP (or distributed system thereof), as part of an OBU (or a distributed system thereof), etc. Various non-limiting examples of system components and/or methods are provided in U.S. Provisional Patent Application No. 62/222, 098, filed Sep. 22, 2015, and titled "Systems and Method for Managing Mobility in a Network of Moving Things," the entire contents of which are hereby incorporated herein by reference. Note that in an example implementation including a plurality of MCs, such MCs may be co-located and/or may be geographically distributed.

It should be understood that the term "vehicle" includes "autonomous vehicles" and "driver assisted vehicles," as well as any other type of vehicles. For example, a vehicle may be, as examples, and without limitation, a node for use on land and/or under land, watercraft for use on water and/or under water (e.g., boats, ships, speedboats, tugboats, barges, submarines, etc.), aircraft/spacecraft for use in air and/or space (e.g., drones, airplanes, satellites, etc.). The applications within a vehicle may be applicable to the operation of the vehicle, or may be applications used by a passenger in the vehicle. For example, if the vehicle is an autonomously operating bus, in addition to the vast amounts of data needed for the operation of the bus, there may be numerous passengers in the bus that are receiving data (streaming movies, songs, etc.) or transmitting data (uploading videos/pictures, chats, etc.).

Various aspects of the present disclosure also provide a Cloud-based service-oriented architecture that handles the real-time management, monitoring and reporting of the network and clients, the functionalities required for data storage, processing and management, the Wi-Fi client authentication and Captive Portal display, etc.

A communication network (or component thereof) in accordance with various aspects of the present disclosure, for example, may support a wide range of smart city applications (or controlled scenarios, or connected scenarios, etc.) and/or use-cases, as described herein.

For example, an example implementation may operate to turn each vehicle (e.g., both public and private taxis, buses, trucks, etc.) into a mobile AP (e.g., a mobile Wi-Fi hotspot), offering Internet access to employees, passengers and mobile users travelling in the city, waiting in bus stops, sitting in parks, etc. Moreover, through an example vehicular mesh network formed between vehicles and/or fleets of vehicles, an implementation may be operable to offload cellular traffic through the mobile Wi-Fi hotspots and/or fixed APs (e.g., 802.11p-based APs) spread over the city and connected to the wired infrastructure of public or private telecom operators in strategic places, while ensuring the widest possible coverage at the lowest possible cost.

An example implementation (e.g., of a communication network and/or components thereof), for example, may be operable as a massive urban scanner that gathers large amounts of data (e.g., continuously) on-the-move, actionable or not, generated by a myriad of sources spanning from the in-vehicle sensors or On Board Diagnostic System port (e.g., OBD2, etc.), interface with an autonomous vehicle driving system, external Wi-Fi/Bluetooth-enabled sensing units spread over the city, devices of vehicles' drivers and passengers (e.g., information characterizing such devices and/or passengers, etc.), positioning system devices (e.g., position information, velocity information, trajectory information, travel history information, etc.), etc.

Depending on the use case, the OBU may for example process (or computer, transform, manipulate, aggregate, summarize, etc.) the data before sending the data from the vehicle, for example providing the appropriate granularity (e.g., value resolution) and sampling rates (e.g., temporal resolution) for each individual application. For example, the OBU, for example, may process the data in any manner deemed advantageous by the system. The OBU, for example, may send the collected data (e.g., raw data, preprocessed data, information of metrics calculated based on the collected data, etc.) to the Cloud (e.g., to one or more networked servers coupled to any portion of the network) in an efficient and reliable manner to improve the efficiency, environmental impact and social value of municipal city operations and transportation services. Various example use cases are described herein.

In an example scenario in which public buses are moving along city routes and/or taxis are performing their private transportation services, the OBU is able to collect large quantities of real-time data from the positioning systems (e.g., GPS, etc.), from accelerometer modules, etc. The OBU may then, for example, communicate such data to the Cloud, where the data may be processed, reported and viewed, for example to support such public or private bus and/or taxi operations, for example supporting efficient remote monitoring and scheduling of buses and taxis, respectively.

In an example implementation, small cameras (or other sensors) may be coupled to small single-board computers (SBCs) that are placed above the doors of public buses to allow capturing image sequences of people entering and leaving buses, and/or on stops along the bus routes in order to estimate the number of people waiting for a bus. Such data may be gathered by the OBU in order to be sent to the Cloud. With such data, public transportation systems may detect peaks; overcrowded buses, routes and stops; underutilized buses, routes and stops; etc., enabling action to be taken in real-time (e.g., reducing bus periodicity to decrease fuel costs and $CO_2$ emissions where and when passenger flows are smaller, etc.) as well as detecting systematic transportation problems.

An OBU, for example, may be operable to communicate with any of a variety of Wi-Fi-enabled sensor devices equipped with a heterogeneous collection of environmental sensors. Such sensors, for example, may comprise noise sensors (microphones, etc.), gas sensors (e.g., sensing CO, $NO_2$, $O_3$, volatile organic compounds (or VOCs), $CO_2$, etc.), smoke sensors, pollution sensors, meteorological sensors (e.g., sensing temperature, humidity, luminosity, particles, solar radiation, wind speed (e.g., anemometer), wind direction, rain (e.g., a pluviometer), optical scanners, biometric scanners, cameras, microphones, etc.). Such sensors may also comprise sensors associated with users (e.g., vehicle operators or passengers, passersby, etc.) and/or their personal devices (e.g., smart phones or watches, biometrics sensors, wearable sensors, implanted sensors, etc.). Such sensors, for example, may comprise sensors and/or systems associated with on-board diagnostic (OBD) units for vehicles, autonomous vehicle driving systems, etc. Such sensors, for example, may comprise positioning sensors (e.g., GPS sensors, Galileo sensors, GLONASS sensors, etc.). Note that such positioning sensors may be part of a vehicle's operational system (e.g., a local human-controlled vehicle, an autonomous vehicle, a remote human-controlled vehicle, etc.) Such sensors, for example, may comprise container sensors (e.g., garbage can sensors, shipping container sensors, container environmental sensors, container tracking sensors, etc.).

Once a vehicle enters the vicinity of such a sensor device, a wireless link may be established, so that the vehicle (or OBU thereof) can collect sensor data from the sensor device and upload the collected data to a database in the Cloud. The appropriate action can then be taken. In an example waste management implementation, several waste management (or collection) trucks may be equipped with OBUs that are able to communicate periodically with sensors installed on containers in order to gather information about waste level, time passed since last collection, etc. Such information may then sent to the Cloud (e.g., to a waste management application coupled to the Internet, etc.) through the vehicular mesh network, in order to improve the scheduling and/or routing of waste management trucks. Note that various sensors may always be in range of the mobile AP (e.g., vehicle-mounted sensors). Note that the sensor may also (or alternatively) be mobile (e.g., a sensor mounted to another vehicle passing by a mobile AP or fixed AP, a drone-mounted sensor, a pedestrian-mounted sensor, etc.).

In an example implementation, for example in a controlled space (e.g., a port, harbor, airport, factory, plantation, mine, etc.) with many vehicles, machines and employees, a communication network in accordance with various aspects of the present disclosure may expand the wireless coverage of enterprise and/or local Wi-Fi networks, for example without resorting to a Telco-dependent solution based on SIM cards or cellular fees. In such an example scenario, apart from avoiding expensive cellular data plans, limited data rate and poor cellular coverage in some places, a communication network in accordance with various aspects of the present disclosure is also able to collect and/or communicate large amounts of data, in a reliable and real-time manner, where such data may be used to optimize harbor logistics, transportation operations, etc.

For example in a port and/or harbor implementation, by gathering real-time information on the position, speed, fuel consumption and $CO_2$ emissions of the vehicles, the communication network allows a port operator to improve the coordination of the ship loading processes and increase the throughput of the harbor. Also for example, the communication network enables remote monitoring of drivers' behaviors, behaviors of autonomous vehicles and/or control systems thereof, trucks' positions and engines' status, and then be able to provide real-time notifications to drivers (e.g., to turn on/off the engine, follow the right route inside the harbor, take a break, etc.), for example human drivers and/or automated vehicle driving systems, thus reducing the number and duration of the harbor services and trips. Harbor authorities, for example, may quickly detect malfunctioning trucks and abnormal trucks' circulation, thus avoiding accidents in order to increase harbor efficiency, security, and safety. Additionally, the vehicles can also connect to Wi-Fi access points from harbor local operators, and provide Wi-Fi Internet access to vehicles' occupants and surrounding harbor employees, for example allowing pilots to save time by filing reports via the Internet while still on the water.

FIG. 1 shows a block diagram of a communication network 100, in accordance with various aspects of this disclosure. Any or all of the functionality discussed herein may be performed by any or all of the example components of the example network 100. Further, the example network 100 (and/or network components), for example, may share any or all characteristics with the other example networks (and/or network components) 200, 300, 400, 500-570, and 600, discussed herein.

The example network 100, for example, comprises a Cloud that may, for example comprise any of a variety of network level components. The Cloud, for example, may comprise any of a variety of server systems executing applications that monitor and/or control components of the network 100. Such applications also, for example, may manage the collection of information from any of a large array of networked information sources, many examples of which are discussed herein. The Cloud (or a portion thereof) may also be referred to, at times, as an API. For example, Cloud (or a portion thereof) may provide one or more application programming interfaces (APIs) which other devices may use for communicating/interacting with the Cloud.

An example component of the Cloud, for example, may manage interoperability with various multi-Cloud systems and architectures. Another example component (e.g., a Cloud service component), for example, may provide various Cloud services (e.g., captive portal services, authentication, authorization, and accounting (AAA) services, API Gateway services, etc.). An additional example component (e.g., a DevCenter component), for example, may provide network monitoring and/or management functionality, manage the implementation of software updates, etc. A further example component of the Cloud may manage data storage, data analytics, data access, etc. A still further example component of the Cloud may include any of a variety of third-partly applications and services.

The Cloud, for example, may be coupled to the Backbone/Core Infrastructure of the example network 100 via the Internet (e.g., utilizing one or more Internet Service Providers). Though the Internet is provided by example, it should be understood that scope of the present disclosure is not limited thereto.

The Backbone/Core, for example, may comprise any one or more different communication infrastructure components. For example, one or more providers may provide backbone networks or various components thereof. As shown in the example network 100 illustrated in FIG. 1, a Backbone provider may provide wireline access (e.g., PSTN, fiber, cable, etc.). Also for example, a Backbone provider may provide wireless access (e.g., Microwave, LTE/Cellular, 5G/TV Spectrum, etc.).

The Backbone/Core also, for example, may comprise one or more Local Infrastructure Providers. The Backbone/Core also, for example, may comprise a private infrastructure (e.g., run by the network 100 implementer, owner, etc.). The Backbone/Core, for example, may provide any of a variety of Backbone Services (e.g., AAA, Mobility, Monitoring, Addressing, Routing, Content services, Gateway Control services, etc.).

The Backbone/Core Infrastructure may comprise any of a variety of characteristics, non-limiting examples of which are provided herein. For example, the Backbone/Core may be compatible with different wireless or wired technologies for backbone access. The Backbone/Core may also be adaptable to handle public (e.g., municipal, city, campus, etc.) and/or private (e.g., ports, campus, etc.) network infrastructures owned by different local providers, and/or owned by the network implementer or stakeholder. The Backbone/Core, for example, may comprise and/or interface with different Authentication, Authorization, and Accounting (AAA) mechanisms.

The Backbone/Core Infrastructure, for example, may support different modes of operation (e.g., L2 in port implementations, L3 in on-land public transportation implementations, utilizing any one or more of a plurality of different layers of digital IP networking, any combinations thereof, equivalents thereof, etc.) or addressing pools. The Backbone/Core may also for example, be agnostic to the Cloud provider(s) and/or Internet Service Provider(s). Additionally for example, the Backbone/Core may be agnostic to requests coming from any or all subsystems of the network 100 (e.g., mobile APs or OBUs (On Board Units), fixed APs or RSUs (Road Side Units), MCs (Mobility Controllers) or LMAs (Local Mobility Anchors) or Network Controllers, etc.) and/or third-party systems.

The Backbone/Core Infrastructure, for example, may comprise the ability to utilize and/or interface with different data storage/processing systems (e.g., MongoDB, MySQL, Redis, etc.). The Backbone/Core Infrastructure further, for example, may provide different levels of simultaneous access to the infrastructure, services, data, etc.

Figure 2:
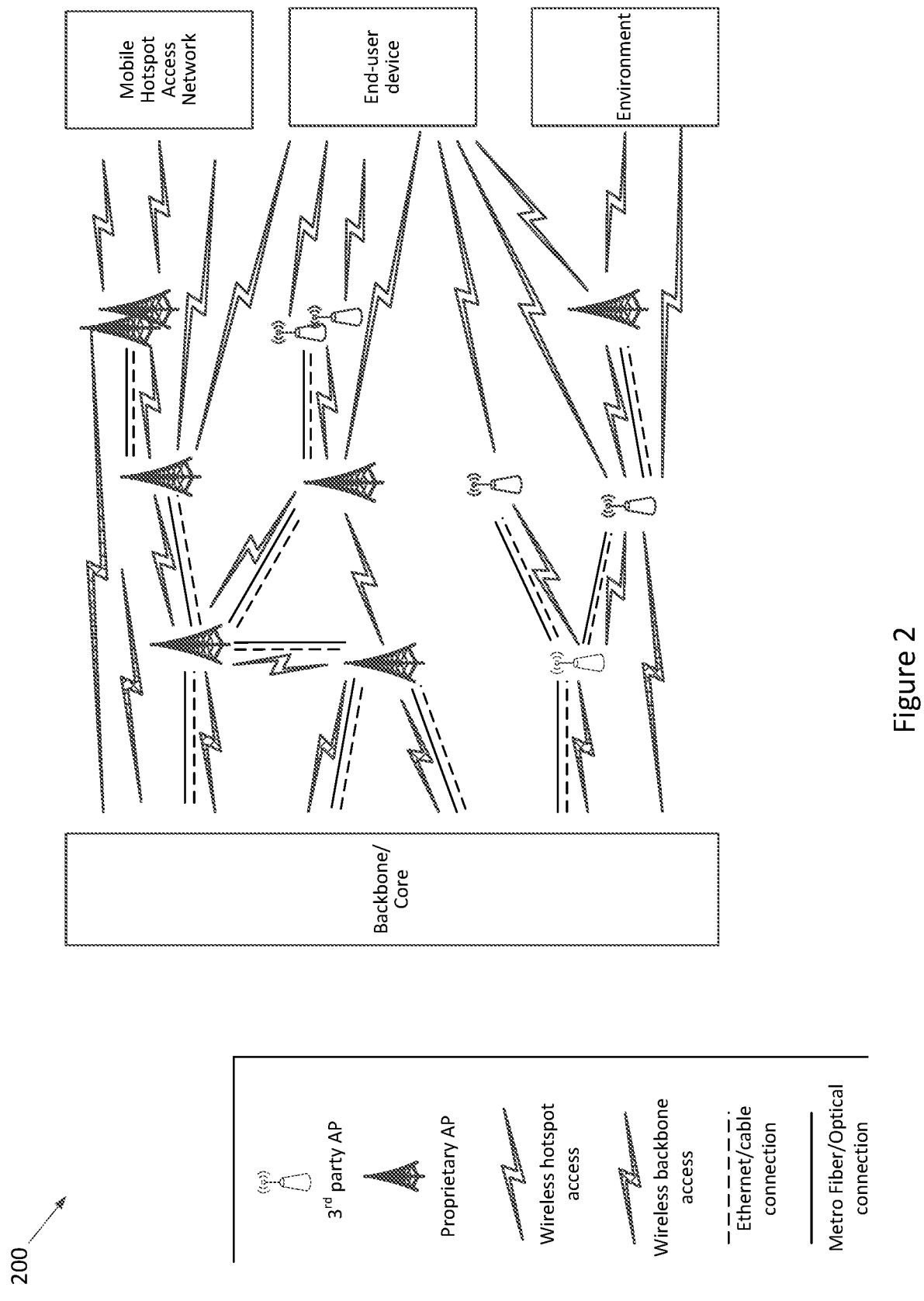
FIG. 2 shows a block diagram of a communication network, in accordance with various aspects of this disclosure.

The example network 100 also, for example, may comprise a Fixed Hotspot Access Network. Various example characteristics of such a Fixed Hotspot Access Network 200 are shown at FIG. 2. The example network 200, for example, may share any or all characteristics with the other example networks (and/or network components) 100, 300, 400, 500-570, and 600, discussed herein.

In the example network 200, the fixed APs (e.g., the proprietary APs, the public third party APs, the private third party APs, etc.) may be directly connected to the local infrastructure provider and/or to the wireline/wireless backbone. Also for example, the example network 200 may comprise a mesh between the various APs via wireless technologies. Note, however, that various wired technologies may also be utilized depending on the implementation. As shown, different fixed hotspot access networks can be connected to a same backbone provider, but may also be connected to different respective backbone providers. In an example implementation utilizing wireless technology for backbone access, such an implementation may be relatively fault tolerant. For example, a fixed AP may utilize wireless communications to the backbone network (e.g., cellular, 3G, LTE, other wide or metropolitan area networks, etc.) if the backhaul infrastructure is down. Also for example, such an implementation may provide for relatively easy installation (e.g., a fixed AP with no cable power source that can be placed virtually anywhere).

In the example network 200, the same fixed AP can simultaneously provide access to multiple fixed APs, mobile APs (e.g., vehicle OBUs, etc.), devices, user devices, sensors, things, etc. For example, a plurality of mobile hotspot access networks (e.g., OBU-based networks, etc.) may utilize the same fixed AP. Also for example, the same fixed AP can provide a plurality of simultaneous accesses to another single unit (e.g., another fixed AP, mobile AP, device, etc.), for example utilizing different channels, different radios, etc.).

Note that a plurality of fixed APs may be utilized for fault-tolerance/fail-recovery purposes. In an example implementation, a fixed AP and its fail-over AP may both be normally operational (e.g., in a same switch). Also for example, one or more fixed APs may be placed in the network at various locations in an inactive or monitoring mode, and ready to become operational when needed (e.g., in response to a fault, in response to an emergency services need, in response to a data surge, etc.).

Referring back to FIG. 1, the example Fixed Hotspot Access Network is shown with a wireless communication link to a backbone provider (e.g., to one or more Backbone Providers and/or Local Infrastructure Providers), to a Mobile Hotspot Access Network, to one or more End User Devices, and to the Environment. Further, the example Fixed Hotspot Access Network is shown with a wired communication link to one or more Backbone Providers, to the Mobile Hotspot Access Network, to one or more End User Devices, and to the Environment. The Environment may comprise any of a variety of devices (e.g., in-vehicle networks, devices, and sensors; autonomous vehicle networks, devices, and sensors; maritime (or watercraft) and port networks, devices, and sensors; general controlled-space networks, devices, and sensors; residential networks, devices, and sensors; disaster recovery & emergency networks, devices, and sensors; military and aircraft networks, devices, and sensors; smart city networks, devices, and sensors; event (or venue) networks, devices, and sensors; underwater and underground networks, devices, and sensors; agricultural networks, devices, and sensors; tunnel (auto, subway, train, etc.) networks, devices, and sensors; parking networks, devices, and sensors; security and surveillance networks, devices, and sensors; shipping equipment and container networks, devices, and sensors; environmental control or monitoring networks, devices, and sensors; municipal networks, devices, and sensors; waste management networks, devices, and sensors, road maintenance networks, devices, and sensors, traffic management networks, devices, and sensors; advertising networks, devices and sensors; etc.).

Figure 3:
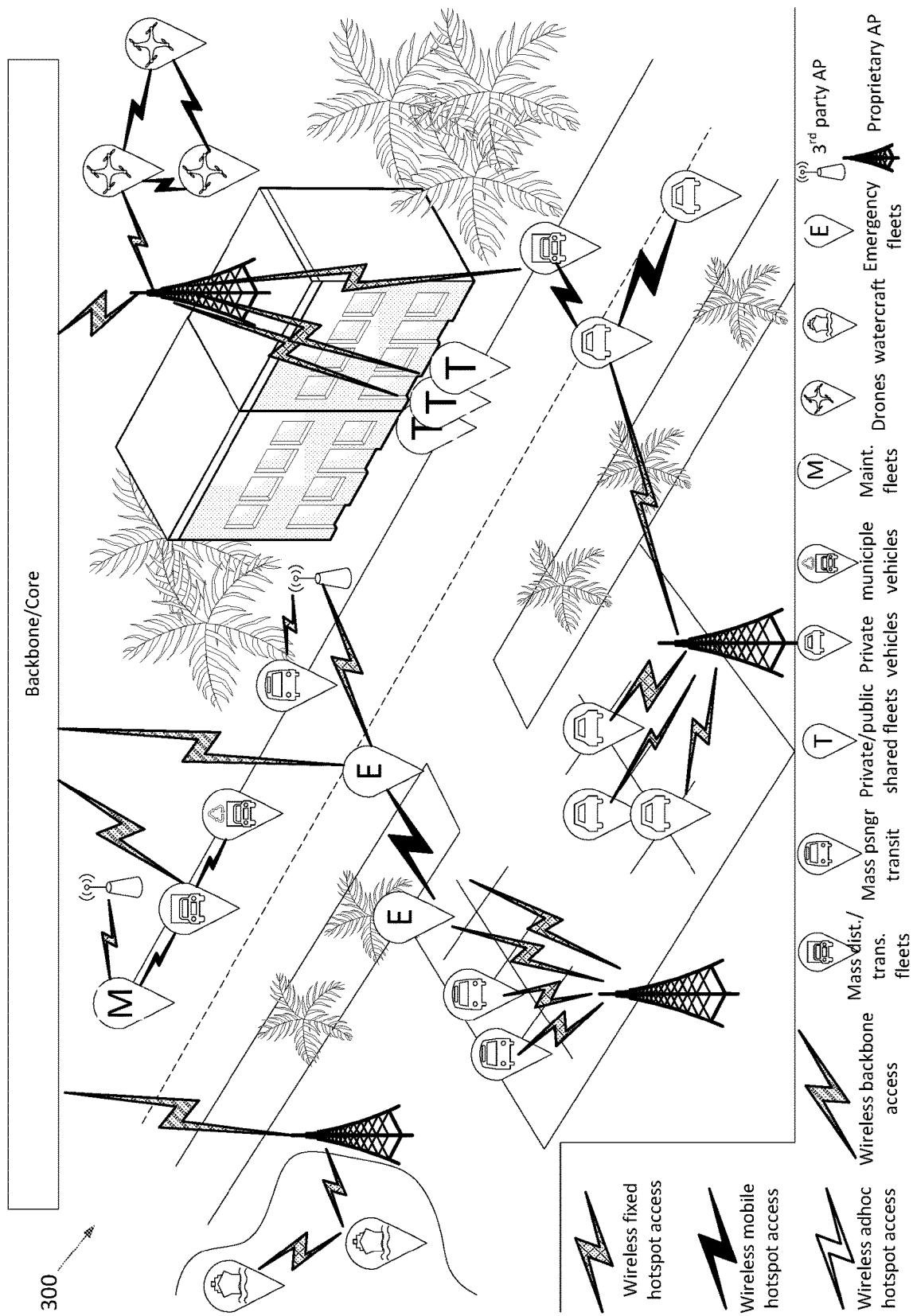
FIG. 3 shows a diagram of a metropolitan area network, in accordance with various aspects of this disclosure.

The example network 100 of FIG. 1 also comprises a Mobile Hotspot Access Network. Various example characteristics of such a Mobile Hotspot Access Network 300 are shown at FIG. 3. Note that various fixed network components (e.g., fixed APs) are also illustrated. The example network 300, for example, may share any or all characteristics with the other example networks (and/or network components) 100, 200, 400, 500-570, and 600, discussed herein.

The example network 300 comprises a wide variety of mobile APs (or hotspots) that provide access to user devices, provide for sensor data collection, provide multi-hop connectivity to other mobile APs, etc. For example, the example network 300 comprises vehicles from different fleets (e.g., aerial, terrestrial, underground, (under)water, etc.). For example, the example network 300 comprises one or more mass distribution/transportation fleets, one or more mass passenger transportation fleets, private/public shared-user fleets, private vehicles, urban and municipal fleets, maintenance fleets, drones, watercraft (e.g., boats, ships, speedboats, tugboats, barges, etc.), emergency fleets (e.g., police, ambulance, firefighter, etc.), etc.

The example network 300, for example, shows vehicles from different fleets directly connected and/or mesh connected, for example using same or different communication technologies. The example network 300 also shows fleets simultaneously connected to different fixed APs, which may or may not belong to different respective local infrastructure providers. As a fault-tolerance mechanism, the example network 300 may for example comprise the utilization of long-range wireless communication network (e.g., cellular, 3G, 4G, LTE, etc.) in vehicles if the local network infrastructure is down or otherwise unavailable. A same vehicle (e.g., mobile AP or OBU) can simultaneously provide access to multiple vehicles, devices, things, etc., for example using a same communication technology (e.g., shared channels and/or different respective channels thereof) and/or using a different respective communication technology for each. Also for example, a same vehicle can provide multiple accesses to another vehicle, device, thing, etc., for example using a same communication technology (e.g., shared channels and/or different respective channels thereof, and/or using a different communication technology).

Additionally, multiple network elements may be connected together to provide for fault-tolerance or fail recovery, increased throughput, or to achieve any or a variety of client's networking needs, many of examples of which are provided herein. For example, two mobile APs (or OBUs) may be installed in a same vehicle, etc.

Referring back to FIG. 1, the example Mobile Hotspot Access Network is shown with a wireless communication link to a backbone provider (e.g., to one or more Backbone Providers and/or Local Infrastructure Providers), to a Fixed Hotspot Access Network, to one or more End User Device, and to the Environment (e.g., to any one of more of the sensors or systems discussed herein, any other device or machine, etc.). Though the Mobile Hotspot Access Network is not shown having a wired link to the various other components, there may (at least at times) be such a wired link, at least temporarily.

Figure 4:
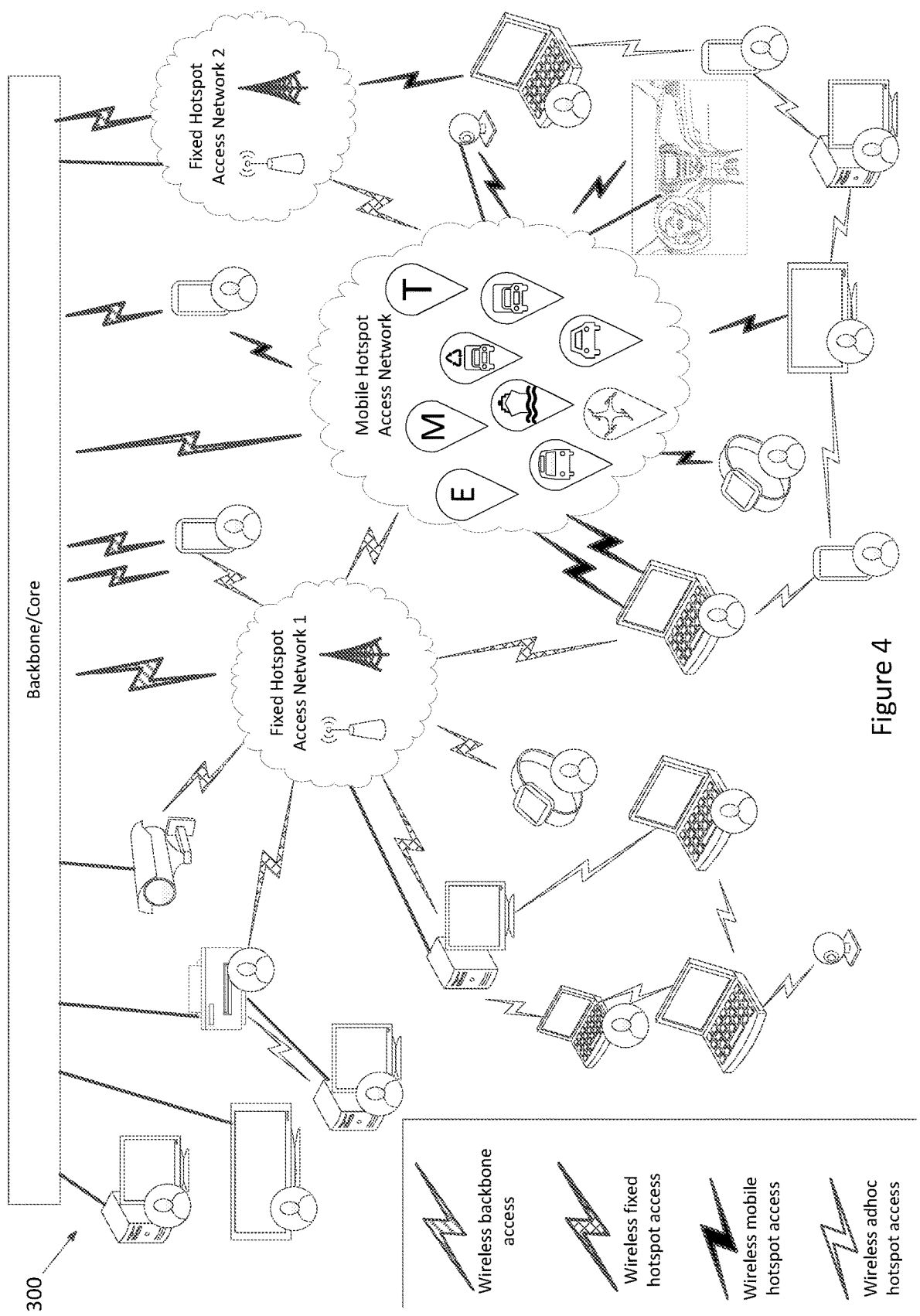
FIG. 4 shows a block diagram of a communication network, in accordance with various aspects of this disclosure.

The example network 100 of FIG. 1 also comprises a set of End-User Devices. Various example end user devices are shown at FIG. 4. Note that various other network components (e.g., Fixed Hotspot Access Networks, Mobile Hotspot Access Network(s), the Backbone/Core, etc.) are also illustrated. The example network 400, for example, may share any or all characteristics with the other example networks (and/or network components) 100, 200, 300, 500-570, and 600, discussed herein.

The example network 400 shows various mobile networked devices. Such network devices may comprise end-user devices (e.g., smartphones, tablets, smartwatches, laptop computers, webcams, personal gaming devices, personal navigation devices, personal media devices, personal cameras, health-monitoring devices, personal location devices, monitoring panels, printers, etc.). Such networked devices may also comprise any of a variety of devices operating in the general environment, where such devices might not for example be associated with a particular user (e.g., any or all of the sensor devices discussed herein, vehicle sensors, municipal sensors, fleet sensors road sensors, environmental sensors, security sensors, traffic sensors, waste sensors, meteorological sensors, any of a variety of different types of municipal or enterprise equipment, etc.). Any of such networked devices can be flexibly connected to distinct backbone, fixed hotspot access networks, mobile hotspot access networks, etc., using the same or different wired/wireless technologies.

A mobile device, for example, may operate as an AP to provide simultaneous access to multiple devices/things, which may then form ad hoc networks, interconnecting devices ultimately connected to distinct backbone networks, fixed hotspot, and/or mobile hotspot access networks. Devices (e.g., any or all of the devices or network nodes discussed herein), for example, may have redundant technologies to access distinct backbone, fixed hotspot, and/or mobile hotspot access networks, for example for fault-tolerance and/or load-balancing purposes (e.g., utilizing multiple SIM cards, etc.). A device also, for example, may simultaneously access distinct backbone, fixed hotspot access networks, and/or mobile hotspot access networks, belonging to the same provider or to different respective providers. Additionally for example, a device can provide multiple accesses to another device/thing (e.g., via different channels, radios, etc.).

Referring back to FIG. 1, the example End-User Devices are shown with a wireless communication link to a backbone provider (e.g., to one or more Backbone Providers and/or Local Infrastructure Providers), to a Fixed Hotspot Access Network, to a Mobile Hotspot Access Network, and to the Environment. Also for example, the example End-User Devices are shown with a wired communication link to a backbone provider, to a Fixed Hotspot Access Network, to a Mobile Hotspot Access Network, and to the Environment.

Figure 5A:
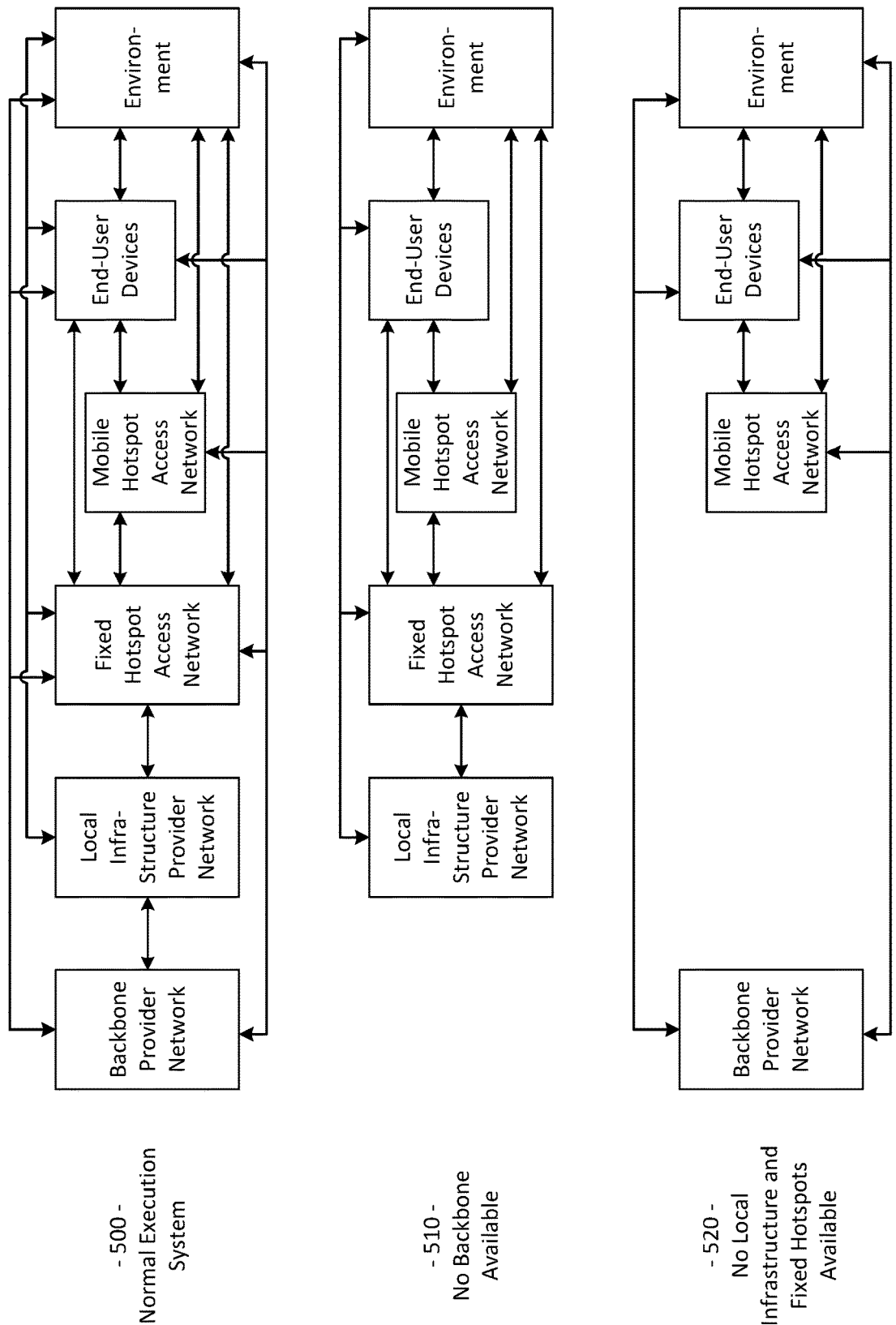
FIGS. 5A-5C show a plurality of network configurations illustrating the flexibility and/or and resiliency of a communication network, in accordance with various aspects of this disclosure.
Figure 5B:
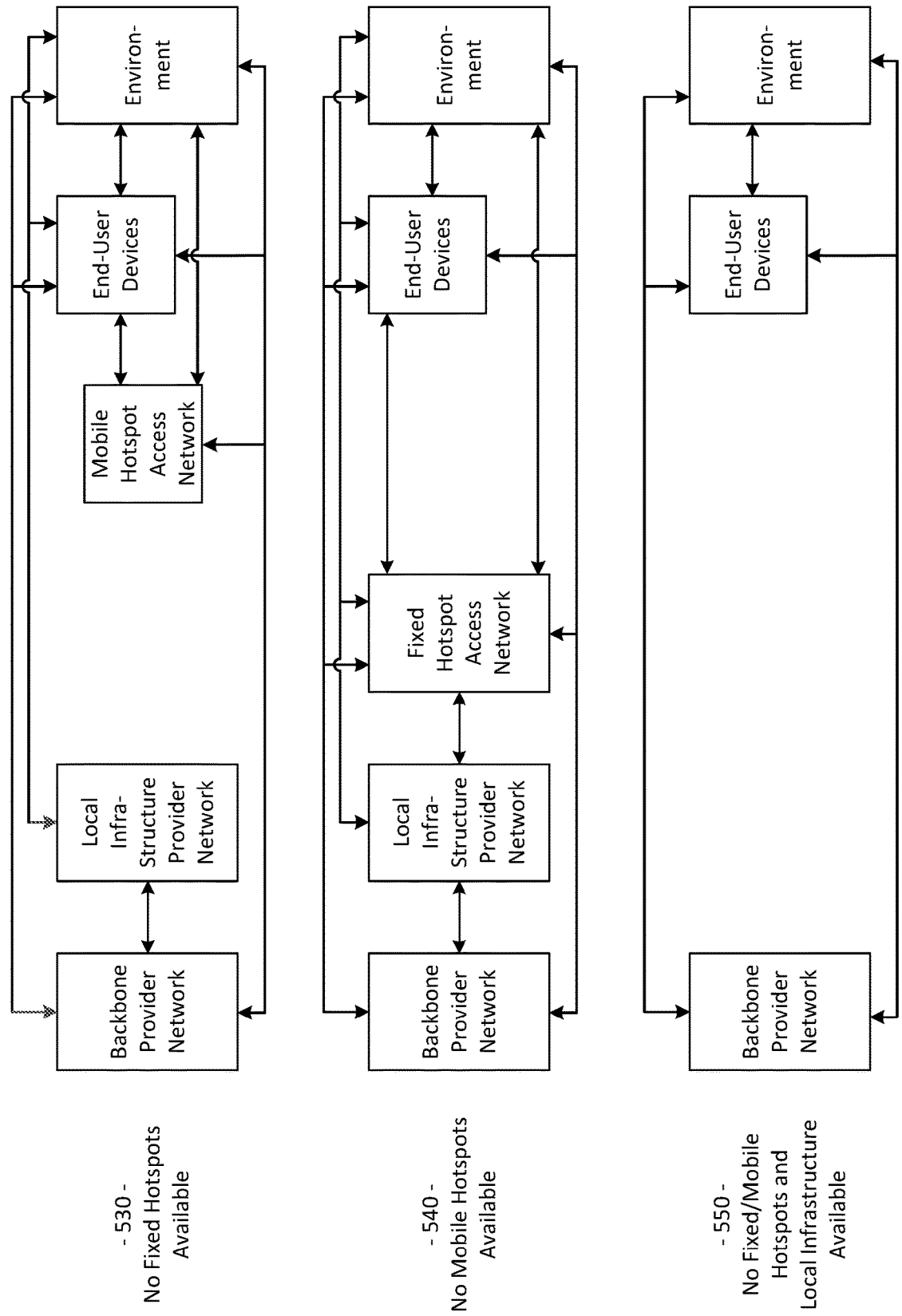
Figure 5C:
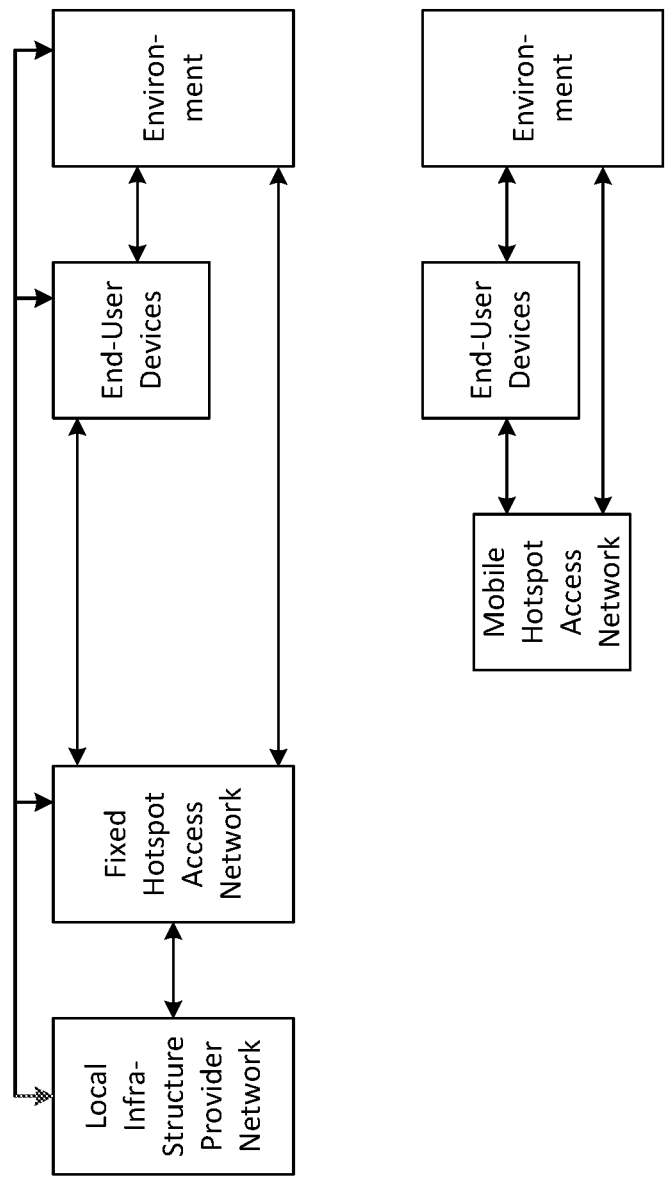

The example network 100 illustrated in FIG. 1 has a flexible architecture that is adaptable at implementation time (e.g., for different use cases) and/or adaptable in real-time, for example as network components enter and leave service. FIGS. 5A-5C illustrate such flexibility by providing example modes (or configurations). The example networks 500-570, for example, may share any or all characteristics with the other example networks (and/or network components) 100, 200, 300, 400, 600, and 700, discussed herein. For example and without limitation, any or all of the communication links (e.g., wired links, wireless links, etc.) shown in the example networks 500-570 are generally analogous to similarly positioned communication links shown in the example network 100 of FIG. 1.

For example, various aspects of this disclosure provide communication network architectures, systems, and methods for supporting a dynamically configurable communication network comprising a complex array of both static and moving communication nodes (e.g., the Internet of moving things). For example, a communication network implemented in accordance with various aspects of the present disclosure may operate in one of a plurality of modalities comprising various fixed nodes, mobile nodes, and/or a combination thereof, which are selectable to yield any of a variety of system goals (e.g., increased throughput, reduced latency and packet loss, increased availability and robustness of the system, extra redundancy, increased responsiveness, increased security in the transmission of data and/or control packets, reduced number of configuration changes by incorporating smart thresholds (e.g., change of technology, change of certificate, change of IP, etc.), providing connectivity in dead zones or zones with difficult access, reducing the costs for maintenance and accessing the equipment for updating/upgrading, etc.). At least some of such modalities, for example, may be entirely comprised of fixed-position nodes, at least temporarily if not permanently.

For illustrative simplicity, many of the example aspects shown in the example system or network 100 of FIG. 1 (and other Figures herein) are omitted from FIGS. 5A-5C, but may be present. For example, the Cloud, Internet, and ISP aspects shown in FIG. 1 and in other Figures are not explicitly shown in FIGS. 5A-5C, but may be present in any of the example configurations (e.g., as part of the backbone provider network or coupled thereto, as part of the local infrastructure provider network or coupled thereto, etc.).

For example, the first example mode 500 is presented as a normal execution mode, such as a mode (or configuration) in which all of the components discussed herein are present. For example, the communication system in the first example mode 500 comprises a backbone provider network, a local infrastructure provider network, a fixed hotspot access network, a mobile hotspot access network, end-user devices, and environment devices.

As shown in FIG. 5A, and in FIG. 1 in more detail, the backbone provider network may be communicatively coupled to any or all of the other elements present in the first example mode 500 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via a wired link. Note that such a wired coupling may be temporary. Further, it should be noted that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the first example mode 500 (or configuration) via one or more wireless links (e.g., RF link, non-tethered optical link, etc.). For example, the backbone provider network may be communicatively coupled to the fixed hotspot access network (or any component thereof), the mobile hotspot access network (or any component thereof), the end-user devices, and/or environment devices via one or more wireless links. Further, it should be noted that in various example configurations, the backbone provider network may also be communicatively coupled to the local infrastructure provider network via one or more wireless (or non-tethered) links.

Though not shown in the first example mode 500 (or any of the example modes of FIGS. 5A-5C), one or more servers may be communicatively coupled to the backbone provider network and/or the local infrastructure network. FIG. 1 provides an example of Cloud servers being communicatively coupled to the backbone provider network via the Internet.

As additionally shown in FIG. 5A, and in FIG. 1 in more detail, the local infrastructure provider network may be communicatively coupled to any or all of the other elements present in the first example mode 500 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Further, it should be noted that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the first example mode 500 (or configuration) via one or more wireless links (e.g., RF link, non-tethered optical link, etc.). For example, the local infrastructure provider network may be communicatively coupled to the backbone provider network (or any component thereof), the fixed hotspot access network (or any component thereof), the mobile hotspot access network (or any component thereof), the end-user devices, and/or environment devices via one or more wireless links. Note that the communication link shown in the first example mode 500 of FIG. 5A between the local infrastructure provider network and the fixed hotspot access network may be wired and/or wireless.

The fixed hotspot access network is also shown in the first example mode 500 to be communicatively coupled to the mobile hotspot access network, the end-user devices, and/or environment devices via one or more wireless links. Many examples of such wireless coupling are provided herein. Additionally, the mobile hotspot access network is further shown in the first example mode 500 to be communicatively coupled to the end-user devices and/or environment devices via one or more wireless links. Many examples of such wireless coupling are provided herein. Further, the end-user devices are also shown in the first example mode 500 to be communicatively coupled to the environment devices via one or more wireless links. Many examples of such wireless coupling are provided herein. Further, it should be noted that in various example implementations, any of such wireless links may comprise instead (or in addition) a wired (or tethered) link.

In the first example mode 500 (e.g., the normal mode), information (or data) may be communicated between an end-user device and a server (e.g., a computer system) via the mobile hotspot access network, the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network, the local infrastructure provider network, and/or the backbone provider network (e.g., skipping the mobile hotspot access network). Also for example, information communicated between an end user device and a server may be communicated via the backbone provider network (e.g., skipping the mobile hotspot access network, fixed hotspot access network, and/or local infrastructure provider network).

Similarly, in the first example mode 500 (e.g., the normal mode), information (or data) may be communicated between an environment device and a server via the mobile hotspot access network, the fixed hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network, the local infrastructure provider network, and/or the backbone provider network (e.g., skipping the mobile hotspot access network). Also for example, information communicated between an environment device and a server may be communicated via the backbone provider network (e.g., skipping the mobile hotspot access network, fixed hotspot access network, and/or local infrastructure provider network). Additionally for example, information communicated between an environment device and a server may be communicated via the local infrastructure provider network (e.g., skipping the mobile hotspot access network and/or fixed hotspot access network).

As discussed herein, the example networks presented herein are adaptively configurable to operate in any of a variety of different modes (or configurations). Such adaptive configuration may occur at initial installation and/or during subsequent controlled network evolution (e.g., adding or removing any or all of the network components discussed herein, expanding or removing network capacity, adding or removing coverage areas, adding or removing services, etc.). Such adaptive configuration may also occur in real-time, for example in response to real-time changes in network conditions (e.g., networks or components thereof being available or not based on vehicle or user-device movement, network or component failure, network or component replacement or augmentation activity, network overloading, etc.). The following example modes are presented to illustrate characteristics of various modes in which a communication system may operate in accordance with various aspects of the present disclosure. The following example modes will generally be discussed in relation to the first example mode 500 (e.g., the normal execution mode). Note that such example modes are merely illustrative and not limiting.

The second example mode (or configuration) 510 (e.g., a no backbone available mode), for example, may share any or all characteristics with the first example mode 500, albeit without the backbone provider network and communication links therewith. For example, the communication system in the second example mode 510 comprises a local infrastructure provider network, a fixed hotspot access network, a mobile hotspot access network, end-user devices, and environment devices.

As shown in FIG. 5A, and in FIG. 1 in more detail, the local infrastructure provider network may be communicatively coupled to any or all of the other elements present in the second example mode 510 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary. Further, it should be noted that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the second example mode 510 (or configuration) via one or more wireless links (e.g., RF link, non-tethered optical link, etc.). For example, the local infrastructure provider network may be communicatively coupled to the fixed hotspot access network (or any component thereof), the mobile hotspot access network (or any component thereof), the end-user devices, and/or environment devices via one or more wireless links. Note that the communication link(s) shown in the second example mode 510 of FIG. 5A between the local infrastructure provider network and the fixed hotspot access network may be wired and/or wireless.

The fixed hotspot access network is also shown in the second example mode 510 to be communicatively coupled to the mobile hotspot access network, the end-user devices, and/or environment devices via one or more wireless links. Many examples of such wireless coupling are provided herein. Additionally, the mobile hotspot access network is further shown in the second example mode 510 to be communicatively coupled to the end-user devices and/or environment devices via one or more wireless links. Many examples of such wireless coupling are provided herein. Further, the end-user devices are also shown in the second example mode 510 to be communicatively coupled to the environment devices via one or more wireless links. Many examples of such wireless coupling are provided herein. Note that in various example implementations any of such wireless links may comprise instead (or in addition) a wired (or tethered) link.

In the second example mode 510 (e.g., the no backbone available mode), information (or data) may be communicated between an end-user device and a server (e.g., a computer, etc.) via the mobile hotspot access network, the fixed hotspot access network, and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the fixed hotspot access network and/or the local infrastructure provider network (e.g., skipping the mobile hotspot access network). Also for example, information communicated between an end user device and a server may be communicated via the local infrastructure provider network (e.g., skipping the mobile hotspot access network and/or fixed hotspot access network).

Similarly, in the second example mode 510 (e.g., the no backbone available mode), information (or data) may be communicated between an environment device and a server via the mobile hotspot access network, the fixed hotspot access network, and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the fixed hotspot access network and/or the local infrastructure provider network (e.g., skipping the mobile hotspot access network). Also for example, information communicated between an environment device and a server may be communicated via the local infrastructure provider network (e.g., skipping the mobile hotspot access network and/or fixed hotspot access network).

The second example mode 510 may be utilized for any of a variety of reasons, non-limiting examples of which are provided herein. For example, due to security and/or privacy goals, the second example mode 510 may be utilized so that communication access to the public Cloud systems, the Internet in general, etc., is not allowed. For example, all network control and management functions may be within the local infrastructure provider network (e.g., wired local network, etc.) and/or the fixed access point network.

In an example implementation, the communication system might be totally owned, operated and/or controlled by a local port authority. No extra expenses associated with cellular connections need be spent. For example, cellular connection capability (e.g., in mobile APs, fixed APs, end user devices, environment devices, etc.) need not be provided. Note also that the second example mode 510 may be utilized in a scenario in which the backbone provider network is normally available but is currently unavailable (e.g., due to server failure, due to communication link failure, due to power outage, due to a temporary denial of service, etc.).

The third example mode (or configuration) 520 (e.g., a no local infrastructure and fixed hotspots available mode), for example, may share any or all characteristics with the first example mode 500, albeit without the local infrastructure provider network, the fixed hotspot access network, and communication links therewith. For example, the communication system in the third example mode 520 comprises a backbone provider network, a mobile hotspot access network, end-user devices, and environment devices.

As shown in FIG. 5A, and in FIG. 1 in more detail, the backbone provider network may be communicatively coupled to any or all of the other elements present in the third example mode 520 (or configuration) via one or more wired (or tethered) links. For example, the backbone provider network may be communicatively coupled to the end-user devices and/or environment devices via one or more wired links. Note that such a wired coupling may be temporary. Further, it should be noted that in various example configurations, the backbone provider network may also, at least temporarily, be communicatively coupled to the mobile hotspot access network (or any component thereof) via one or more wired (or tethered) links.

Also shown in FIG. 5A, and in FIG. 1 in more detail, the backbone provider network may be communicatively coupled to any or all of the other elements present in the third example mode 520 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links.

The mobile hotspot access network is further shown in the third example mode 520 to be communicatively coupled to the end-user devices and/or environment devices via one or more wireless links. Many examples of such wireless coupling are provided herein. Further, the end-user devices are also shown in the third example mode 520 to be communicatively coupled to the environment devices via one or more wireless links. Many examples of such wireless coupling are provided herein. Note that in various example implementations any of such wireless links may comprise instead (or in addition) a wired (or tethered) link.

In the third example mode 520 (e.g., the no local infrastructure and fixed hotspots available mode), information (or data) may be communicated between an end-user device and a server (e.g., a computer, etc.) via the mobile hotspot access network and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the backbone provider network (e.g., skipping the mobile hotspot access network).

Similarly, in the third example mode 520 (e.g., the no local infrastructure and fixed hotspots available mode), information (or data) may be communicated between an environment device and a server via the mobile hotspot access network and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the backbone provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the backbone provider network (e.g., skipping the mobile hotspot access network).

In the third example mode 520, all control/management functions may for example be implemented within the Cloud. For example, since the mobile hotspot access network does not have a communication link via a fixed hotspot access network, the mobile APs may utilize a direct connection (e.g., a cellular connection) with the backbone provider network (or Cloud). If a mobile AP does not have such capability, the mobile AP also, for example, may utilize data access provided by the end-user devices communicatively coupled thereto (e.g., leveraging the data plans of the end-user devices).

The third example mode 520 may be utilized for any of a variety of reasons, non-limiting examples of which are provided herein. In an example implementation, the third example mode 520 may be utilized in an early stage of a larger deployment, for example deployment that will grow into another mode (e.g., the example first mode 500, example fourth mode 530, etc.) as more communication system equipment is installed. Note also that the third example mode 520 may be utilized in a scenario in which the local infrastructure provider network and fixed hotspot access network are normally available but are currently unavailable (e.g., due to equipment failure, due to communication link failure, due to power outage, due to a temporary denial of service, etc.).

The fourth example mode (or configuration) 530 (e.g., a no fixed hotspots available mode), for example, may share any or all characteristics with the first example mode 500, albeit without the fixed hotspot access network and communication links therewith. For example, the communication system in the fourth example mode 530 comprises a backbone provider network, a local infrastructure provider network, a mobile hotspot access network, end-user devices, and environment devices.

As shown in FIG. 5B, and in FIG. 1 in more detail, the backbone provider network may be communicatively coupled to any or all of the other elements present in the fourth example mode 530 (or configuration) via one or more wired (or tethered) links. For example, the backbone provider network may be communicatively coupled to the local infrastructure provider network (or any component thereof), the end-user devices, and/or environment devices via one or more wired links. Note that such a wired coupling may be temporary. Further, it should be noted that in various example configurations, the backbone provider network may also, at least temporarily, be communicatively coupled to the mobile hotspot access network (or any component thereof) via one or more wired (or tethered) links.

Also shown in FIG. 5B, and in FIG. 1 in more detail, the backbone provider network may be communicatively coupled to any or all of the other elements present in the fourth example mode 530 (or configuration) via one or more wireless links (e.g., RF link, non-tethered optical link, etc.). For example, the backbone provider network may be communicatively coupled to the mobile hotspot access network (or any component thereof), the end-user devices, and/or environment devices via one or more wireless links. Further, it should be noted that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fourth example mode 530 (or configuration) via one or more wired (or tethered) links. For example, the local infrastructure provider network may be communicatively coupled to the backbone provider network (or any component thereof), the end-user devices, and/or environment devices via one or more wired links. Note that such a wired coupling may be temporary. Further, it should be noted that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fourth example mode 530 (or configuration) via one or more wireless links (e.g., RF link, non-tethered optical link, etc.). For example, the local infrastructure provider network may be communicatively coupled to the backbone provider network (or any component thereof), the mobile hotspot access network (or any component thereof), the end-user devices, and/or environment devices via one or more wireless links.

The mobile hotspot access network is further shown in the fourth example mode 530 to be communicatively coupled to the end-user devices and/or environment devices via one or more wireless links. Many examples of such wireless coupling are provided herein. Further, the end-user devices are also shown in the fourth example mode 530 to be communicatively coupled to the environment devices via one or more wireless links. Many examples of such wireless coupling are provided herein.

In the fourth example mode 530 (e.g., the no fixed hotspots mode), information (or data) may be communicated between an end-user device and a server via the mobile hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network and/or the backbone provider network (e.g., skipping the mobile hotspot access network). Also for example, information communicated between an end user device and a server may be communicated via the backbone provider network (e.g., skipping the mobile hotspot access network and/or local infrastructure provider network).

Similarly, in the fourth example mode 530 (e.g., the no fixed hotspots available mode), information (or data) may be communicated between an environment device and a server via the mobile hotspot access network, the local infrastructure provider network, and/or the backbone provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the mobile hotspot access network). Also for example, information communicated between an environment device and a server may be communicated via the backbone provider network (e.g., skipping the mobile hotspot access network and/or local infrastructure provider network). Additionally for example, information communicated between an environment device and a server may be communicated via the local infrastructure provider network (e.g., skipping the mobile hotspot access network and/or backbone provider network).

In the fourth example mode 530, in an example implementation, some of the control/management functions may for example be implemented within the local backbone provider network (e.g., within a client premises). For example, communication to the local infrastructure provider may be performed through the backbone provider network (or Cloud). Note that in a scenario in which there is a direct communication pathway between the local infrastructure provider network and the mobile hotspot access network, such communication pathway may be utilized.

For example, since the mobile hotspot access network does not have a communication link via a fixed hotspot access network, the mobile APs may utilize a direct connection (e.g., a cellular connection) with the backbone provider network (or Cloud). If a mobile AP does not have such capability, the mobile AP also, for example, may utilize data access provided by the end-user devices communicatively coupled thereto (e.g., leveraging the data plans of the end-user devices).

The fourth example mode 530 may be utilized for any of a variety of reasons, non-limiting examples of which are provided herein. In an example implementation, the fourth example mode 530 may be utilized in an early stage of a larger deployment, for example a deployment that will grow into another mode (e.g., the example first mode 500, etc.) as more communication system equipment is installed. The fourth example mode 530, for example, may be utilized in a scenario in which there is no fiber (or other) connection available for fixed APs (e.g., in a maritime scenario, in a plantation scenario, etc.), or in which a fixed AP is difficult to access or connect. For example, one or more mobile APs of the mobile hotspot access network may be used as gateways to reach the Cloud. The fourth example mode 530 also, for example, may be utilized when a vehicle fleet and/or the mobile APs associated therewith are owned by a first entity and the fixed APs are owned by another entity, and there is no present agreement for communication between the mobile APs and the fixed APs. Note also that the fourth example mode 530 may be utilized in a scenario in which the fixed hotspot access network is normally available but are currently unavailable (e.g., due to equipment failure, due to communication link failure, due to power outage, due to a temporary denial of service, etc.).

The fifth example mode (or configuration) 540 (e.g., a no mobile hotspots available mode), for example, may share any or all characteristics with the first example mode 500, albeit without the mobile hotspot access network and communication links therewith. For example, the communication system in the fifth example mode 540 comprises a backbone provider network, a local infrastructure provider network, a fixed hotspot access network, end-user devices, and environment devices.

As shown in FIG. 5B, and in FIG. 1 in more detail, the backbone provider network may be communicatively coupled to any or all of the other elements present in the fifth example mode 540 (or configuration) via one or more wired (or tethered) links. For example, the backbone provider network may be communicatively coupled to the local infrastructure provider network (or any component thereof), fixed hotspot access network (or any component thereof), the end-user devices, and/or environment devices via one or more wired links. Note that such a wired coupling may be temporary.

Also shown in FIG. 5B, and in FIG. 1 in more detail, the backbone provider network may be communicatively coupled to any or all of the other elements present in the fifth example mode 540 (or configuration) via one or more wireless links (e.g., RF link, non-tethered optical link, etc.). For example, the backbone provider network may be communicatively coupled to the fixed hotspot access network (or any component thereof), the end-user devices, and/or environment devices via one or more wireless links. Further, it should be noted that in various example configurations, the backbone provider network may also be communicatively coupled to the local infrastructure provider network via one or more wireless (or non-tethered) links.

As additionally shown in FIG. 5B, and in FIG. 1 in more detail, the local infrastructure provider network may be communicatively coupled to any or all of the other elements present in the fifth example mode 540 (or configuration) via one or more wired (or tethered) links. For example, the local infrastructure provider network may be communicatively coupled to the backbone provider network (or any component thereof), fixed hotspot access network (or any component thereof), the end-user devices, and/or environment devices via one or more wired links. Note that such a wired coupling may be temporary. Further, it should be noted that in various example configurations, the local infrastructure provider network may also, at least temporarily, be communicatively coupled to the mobile hotspot access network (or any component thereof) via one or more wired (or tethered) links.

Also, though not explicitly shown, the local infrastructure provider network may be communicatively coupled to any or all of the other elements present in the fifth example mode 540 (or configuration) via one or more wireless links (e.g., RF link, non-tethered optical link, etc.). For example, the local infrastructure provider network may be communicatively coupled to the backbone provider network, the fixed hotspot access network (or any component thereof), the end-user devices, and/or environment devices via one or more wireless links. Note that the communication link(s) shown in the fifth example mode 540 of FIG. 5B between the local infrastructure provider network and the fixed hotspot access network may be wired and/or wireless.

The fixed hotspot access network is also shown in the fifth example mode 540 to be communicatively coupled to the end-user devices and/or environment devices via one or more wireless links. Many examples of such wireless coupling are provided herein. Further, the end-user devices are also shown in the fifth example mode 540 to be communicatively coupled to the environment devices via one or more wireless links. Many examples of such wireless coupling are provided herein.

In the fifth example mode 540 (e.g., the no mobile hotspots available mode), information (or data) may be communicated between an end-user device and a server via the fixed hotspot access network, the local infrastructure provider network, and/or the backbone provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network, and/or the backbone provider network (e.g., skipping the fixed hotspot access network). Also for example, information communicated between an end user device and a server may be communicated via the backbone provider network (e.g., skipping the fixed hotspot access network and/or local infrastructure provider network).

Similarly, in the fifth example mode 540 (e.g., the no mobile hotspots available mode), information (or data) may be communicated between an environment device and a server via the fixed hotspot access network, the local infrastructure provider network, and/or the backbone provider network. Also for example, an environment device may communicate with or through an end-user device (e.g., instead of or in addition to the fixed hotspot access network). As will be seen in the various example modes presented herein, such communication may flexibly occur between an environment device and a server (e.g., communicatively coupled to the local infrastructure provider network and/or backbone provider network) via any of a variety of different communication pathways, for example depending on the availability of a network, depending on bandwidth utilization goals, depending on communication priority, depending on communication time (or latency) and/or reliability constraints, depending on cost, etc.

For example, information communicated between an environment device and a server may be communicated via the local infrastructure provider network and/or the backbone provider network (e.g., skipping the fixed hotspot access network). Also for example, information communicated between an environment device and a server may be communicated via the backbone provider network (e.g., skipping the fixed hotspot access network and/or local infrastructure provider network). Additionally for example, information communicated between an environment device and a server may be communicated via the local infrastructure provider network (e.g., skipping the fixed hotspot access network and/or the backbone provider network).

In the fifth example mode 540, in an example implementation, the end-user devices and environment devices may communicate directly to fixed APs (e.g., utilizing Ethernet, Wi-Fi, etc.). Also for example, the end-user devices and/or environment devices may communicate directly with the backbone provider network (e.g., utilizing cellular connections, etc.).

The fifth example mode 540 may be utilized for any of a variety of reasons, non-limiting examples of which are provided herein. In an example implementation in which end-user devices and/or environment devices may communicate directly with fixed APs, such communication may be utilized instead of mobile AP communication. For example, the fixed hotspot access network might provide coverage for all desired areas.

Note also that the fifth example mode 540 may be utilized in a scenario in which the fixed hotspot access network is normally available but is currently unavailable (e.g., due to equipment failure, due to communication link failure, due to power outage, due to a temporary denial of service, etc.).

The sixth example mode (or configuration) 550 (e.g., the no fixed/mobile hotspots and local infrastructure available mode), for example, may share any or all characteristics with the first example mode 500, albeit without the local infrastructure provider network, fixed hotspot access network, mobile hotspot access network, and communication links therewith. For example, the communication system in the sixth example mode 550 comprises a backbone provider network, end-user devices, and environment devices.

As shown in FIG. 5B, and in FIG. 1 in more detail, the backbone provider network may be communicatively coupled to any or all of the other elements present in the sixth example mode 550 (or configuration) via one or more wired (or tethered) links. For example, the backbone provider network may be communicatively coupled to the end-user devices and/or environment devices via one or more wired links. Note that such a wired coupling may be temporary.

Also shown in FIG. 5B, and in FIG. 1 in more detail, the backbone provider network may be communicatively coupled to any or all of the other elements present in the sixth example mode 550 (or configuration) via one or more wireless links (e.g., RF link, non-tethered optical link, etc.). For example, the backbone provider network may be communicatively coupled to the end-user devices and/or environment devices via one or more wireless links.

The end-user devices are also shown in the sixth example mode 550 to be communicatively coupled to the environment devices via one or more wireless links. Many examples of such wireless coupling are provided herein.

In the sixth example mode 550 (e.g., the no fixed/mobile hotspots and local infrastructure available mode), information (or data) may be communicated between an end-user device and a server via the backbone provider network. Similarly, in the sixth example mode 550 (e.g., the no fixed/mobile hotspots and local infrastructure mode), information (or data) may be communicated between an environment device and a server via the backbone provider network. Also for example, an environment device may communicate with or through an end-user device (e.g., instead of or in addition to the mobile hotspot access network).

The sixth example mode 550 may be utilized for any of a variety of reasons, non-limiting examples of which are provided herein. In an example implementation, for example in which an end-user has not yet subscribed to the communication system, the end-user device may subscribe to the system through a Cloud application and by communicating directly with the backbone provider network (e.g., via cellular link, etc.). The sixth example mode 550 also, for example, may be utilized in rural areas in which mobile AP presence is sparse, fixed AP installation is difficult or impractical, etc.

Note also that the sixth example mode 550 may be utilized in a scenario in which the infrastructure provider network, fixed hotspot access network, and/or mobile hotspot access network are normally available but are currently unavailable (e.g., due to equipment failure, due to communication link failure, due to power outage, due to a temporary denial of service, etc.).

The seventh example mode (or configuration) 560 (e.g., the no backbone and mobile hotspots available mode), for example, may share any or all characteristics with the first example mode 500, albeit without the backbone provider network, mobile hotspot access network, and communication links therewith. For example, the communication system in the seventh example mode 560 comprises a local infrastructure provider network, fixed hotspot access network, end-user devices, and environment devices.

As shown in FIG. 5C, and in FIG. 1 in more detail, the local infrastructure provider network may be communicatively coupled to any or all of the other elements present in the seventh example mode 560 (or configuration) via one or more wired (or tethered) links. For example, the local infrastructure provider network may be communicatively coupled to the fixed hotspot access network (or any component thereof), the end-user devices, and/or environment devices via one or more wired links. Note that such a wired coupling may be temporary.

Also, though not explicitly shown, the local infrastructure provider network may be communicatively coupled to any or all of the other elements present in the seventh example mode 560 (or configuration) via one or more wireless links (e.g., RF link, non-tethered optical link, etc.). For example, the local infrastructure provider network may be communicatively coupled to the fixed hotspot access network (or any component thereof), the end-user devices, and/or environment devices via one or more wireless links. Note that the communication link shown in the seventh example mode 560 of FIG. 5C between the local infrastructure provider network and the fixed hotspot access network may be wired and/or wireless.

The fixed hotspot access network is also shown in the seventh example mode 560 to be communicatively coupled to the end-user devices and/or environment devices via one or more wireless links. Many examples of such wireless coupling are provided herein. Additionally, the end-user devices are also shown in the seventh example mode 560 to be communicatively coupled to the environment devices via one or more wireless links. Many examples of such wireless coupling are provided herein.

In the seventh example mode 560 (e.g., the no backbone and mobile hotspots available mode), information (or data) may be communicated between an end-user device and a server via the fixed hotspot access network and/or the local infrastructure provider network. As will be seen in the various example modes presented herein, such communication may flexibly occur between an end-user device and a server via any of a variety of different communication pathways, for example depending on the availability of a network, depending on bandwidth utilization goals, depending on communication priority, depending on communication time (or latency) and/or reliability constraints, depending on cost, etc. For example, information communicated between an end user device and a server may be communicated via the local infrastructure provider network (e.g., skipping the fixed hotspot access network).

Similarly, in the seventh example mode 560 (e.g., the no backbone and mobile hotspots available mode), information (or data) may be communicated between an environment device and a server via the fixed hotspot access network and/or the local infrastructure provider network. Also for example, an environment device may communicate with or through an end-user device (e.g., instead of or in addition to the mobile hotspot access network). As will be seen in the various example modes presented herein, such communication may flexibly occur between an environment device and a server (e.g., communicatively coupled to the local infrastructure provider network) via any of a variety of different communication pathways, for example depending on the availability of a network, depending on bandwidth utilization goals, depending on communication priority, depending on communication time (or latency) and/or reliability constraints, depending on cost, etc. For example, information communicated between an environment device and a server may be communicated via the local infrastructure provider network (e.g., skipping the fixed hotspot access network).

The seventh example mode 560 may be utilized for any of a variety of reasons, non-limiting examples of which are provided herein. In an example controlled space implementation, Cloud access might not be provided (e.g., for security reasons, privacy reasons, etc.), and full (or sufficient) coverage of the coverage area is provided by the fixed hotspot access network, and thus the mobile hotspot access network is not needed. For example, the end-user devices and environment devices may communicate directly (e.g., via Ethernet, Wi-Fi, etc.) with the fixed APs.

Note also that the seventh example mode 560 may be utilized in a scenario in which the backbone provider network and/or fixed hotspot access network are normally available but are currently unavailable (e.g., due to equipment failure, due to communication link failure, due to power outage, due to a temporary denial of service, etc.).

The eighth example mode (or configuration) 570 (e.g., the no backbone, fixed hotspots, and local infrastructure available mode), for example, may share any or all characteristics with the first example mode 500, albeit without the backbone provider network, local infrastructure provider network, fixed hotspot access network, and communication links therewith. For example, the communication system in the eighth example mode 570 comprises a mobile hotspot access network, end-user devices, and environment devices.

As shown in FIG. 5C, and in FIG. 1 in more detail, the mobile hotspot access network is shown in the eighth example mode 570 to be communicatively coupled to the end-user devices and/or environment devices via one or more wireless links. Many examples of such wireless coupling are provided herein. Further, the end-user devices are also shown in the eighth example mode 570 to be communicatively coupled to the environment devices via one or more wireless links. Many examples of such wireless coupling are provided herein.

In the eighth example mode 570 (e.g., the no backbone, fixed hotspots, and local infrastructure available mode), information (or data) might not (at least currently) be communicated between an end-user device and a server (e.g., a coupled to the backbone provider network, local infrastructure provider network, etc.). Similarly, information (or data) might not (at least currently) be communicated between an environment device and a server (e.g., a coupled to the backbone provider network, local infrastructure provider network, etc.). Note that the environment device may communicate with or through an end-user device (e.g., instead of or in addition to the mobile hotspot access network).

The eighth example mode 570 may be utilized for any of a variety of reasons, non-limiting examples of which are provided herein. In an example implementation, the eighth example mode 570 may be utilized for gathering and/or serving data (e.g., in a delay-tolerant networking scenario), providing peer-to-peer communication through the mobile hotspot access network (e.g., between clients of a single mobile AP, between clients of respective different mobile APs, etc.), etc. In another example scenario, the eighth example mode 570 may be utilized in a scenario in which vehicle-to-vehicle communications are prioritized above vehicle-to-infrastructure communications. In yet another example scenario, the eighth example mode 570 may be utilized in a scenario in which all infrastructure access is lost (e.g., in tunnels, parking garages, etc.).

Note also that the eighth example mode 570 may be utilized in a scenario in which the backbone provider network, local infrastructure provider network, and/or fixed hotspot access network are normally available but are currently unavailable (e.g., due to equipment failure, due to communication link failure, due to power outage, due to a temporary denial of service, etc.).

As shown and discussed herein, it is beneficial to have a generic platform that allows multi-mode communications of multiple users or machines within different environments, using multiple devices with multiple technologies and/or multiple networks, connected to multiple moving/static things with multiple technologies and/or multiple networks, forming wireless (mesh) hotspot networks over different environments, connected to multiple wired/wireless infrastructure/network backbone providers, ultimately connected to the Internet, Cloud or private network infrastructure.

Figure 6:
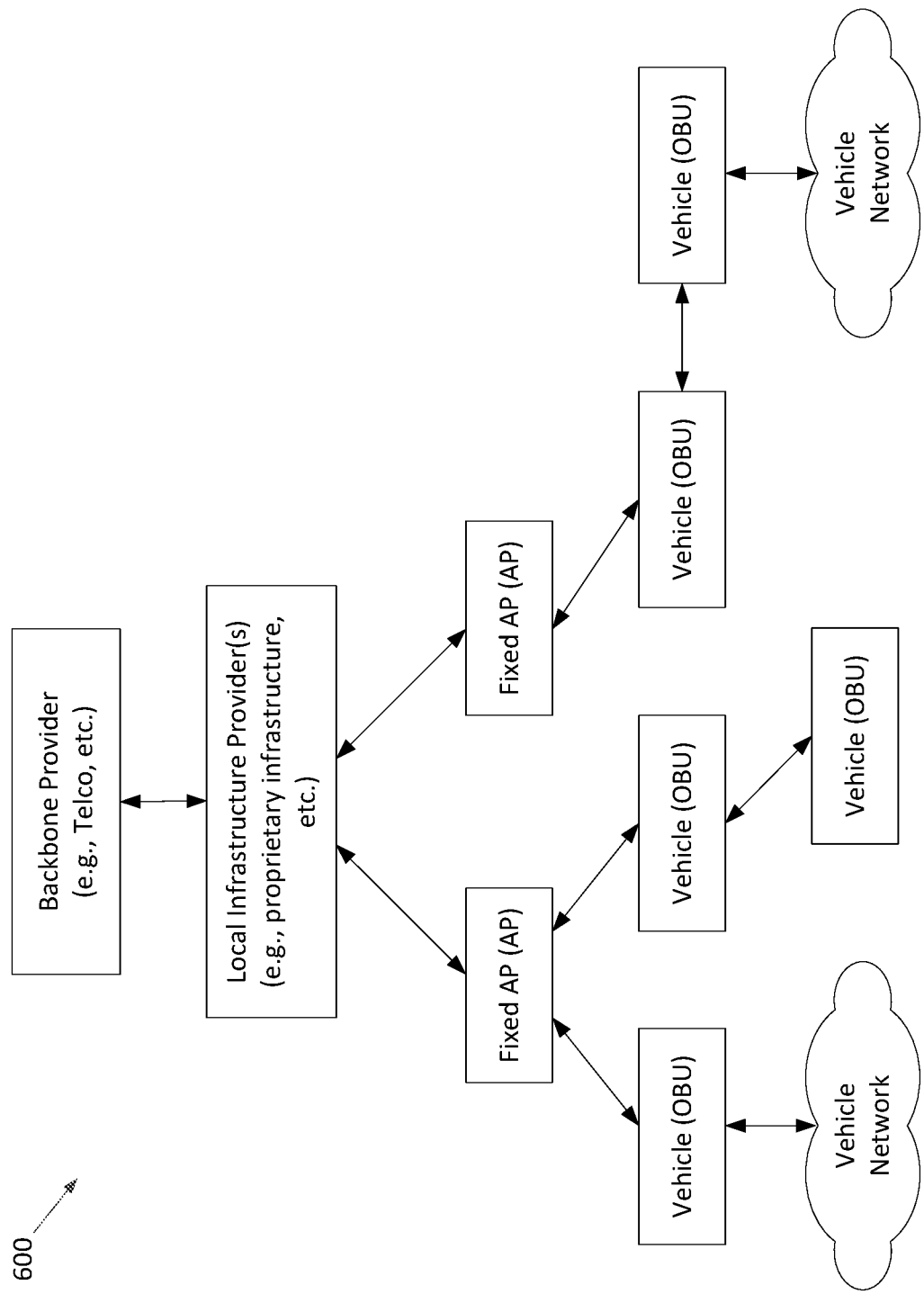
FIG. 6 shows a block diagram of an example communication network, in accordance with various aspects of the present disclosure.

FIG. 6 shows yet another block diagram of an example network configuration, in accordance with various aspects of the present disclosure. The example network 600, for example, may share any or all characteristics with the other example networks and/or network components 100, 200, 300, 400, 500-570, and 600, discussed herein. Notably, the example network 600 shows a plurality of mobile APs (or OBUs), each communicatively coupled to a fixed AP (or RSU), where each mobile AP may provide network access to a vehicle network (e.g., comprising other vehicles or vehicle networks, user devices, sensor devices, etc.).

In some instances, the various resources and/or capabilities available in networks of moving things (e.g., a vehicle network, a network of or including autonomous vehicles, etc.) may be utilized to optimize operations and/or services in such networks. In various implementations in accordance with the present disclosure, for example, such networks may be configured for supporting use of adaptive and dynamic Wi-Fi scanning policies, as described in more detail below.

Figure 7:
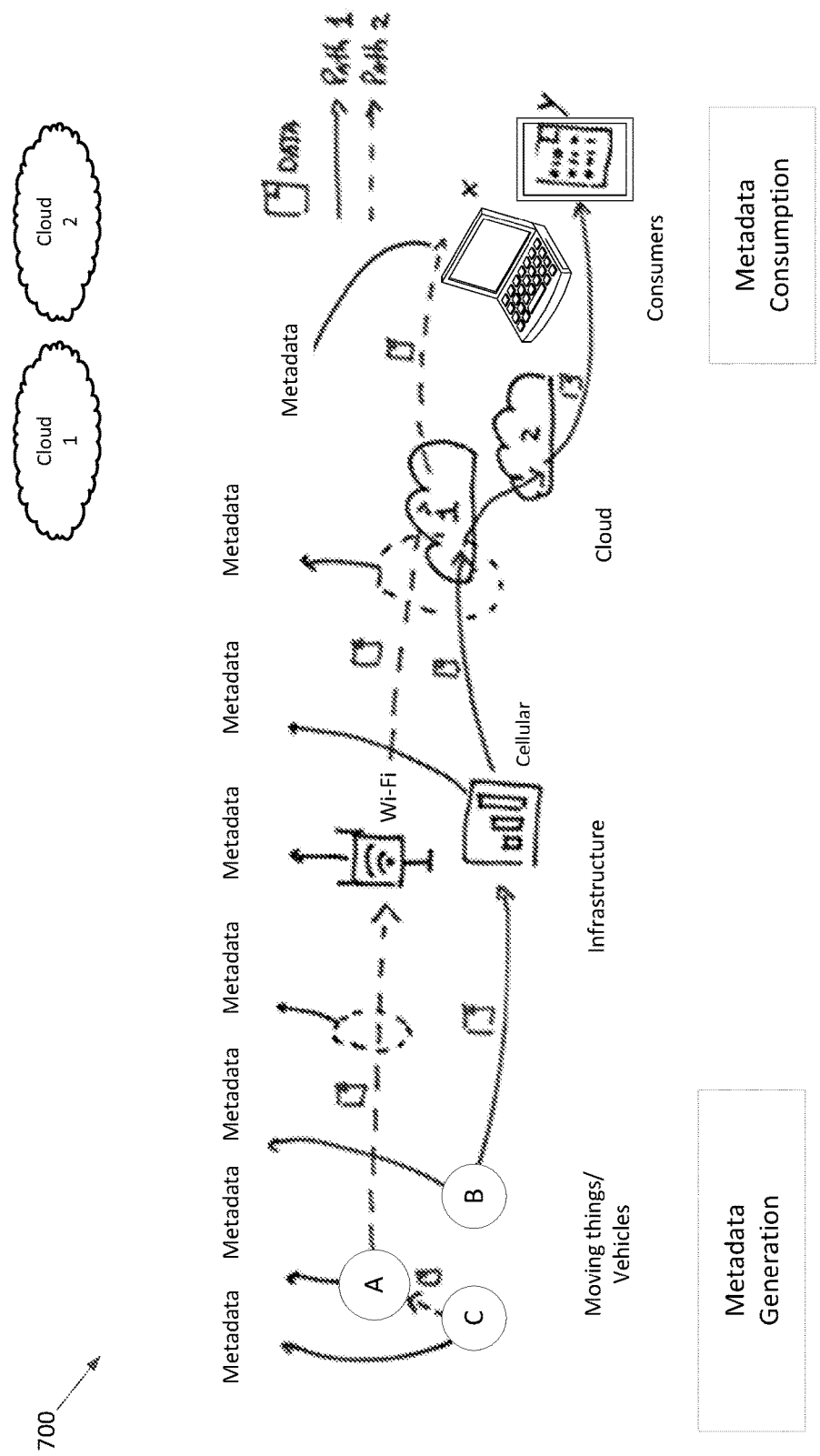
FIG. 7 shows an example data life-cycle from generation to consumption in the Internet of Moving Things, in accordance with various aspects of the disclosure.

FIG. 7 shows an example data life-cycle from generation to consumption in the Internet of Moving Things, in accordance with various aspects of the disclosure. Referring to FIG. 7, there is shown a chart 700 illustrating a simplified scenario of example communication among moving things, infrastructure, and consumers. Sending data from an entity C to the Cloud may take multiple paths that are in constant change. In this scenario, the entity C has sent data to the infrastructure it was connected to via the entity A. The data arrived at Cloud 1 and then sent to consumer X (application or service). Entity B took a different route and wireless technology to be sent to consumer Y.

As the data matures throughout its life-cycle, metadata is generated, classified, tagged and sent on along the path the data is taking through The Internet of Moving Things. Along its life-cycle, the metadata is being accounted for billing at the consumer, which may be a service or application in the Cloud, or a service or application in another vehicle.

Figure 8:
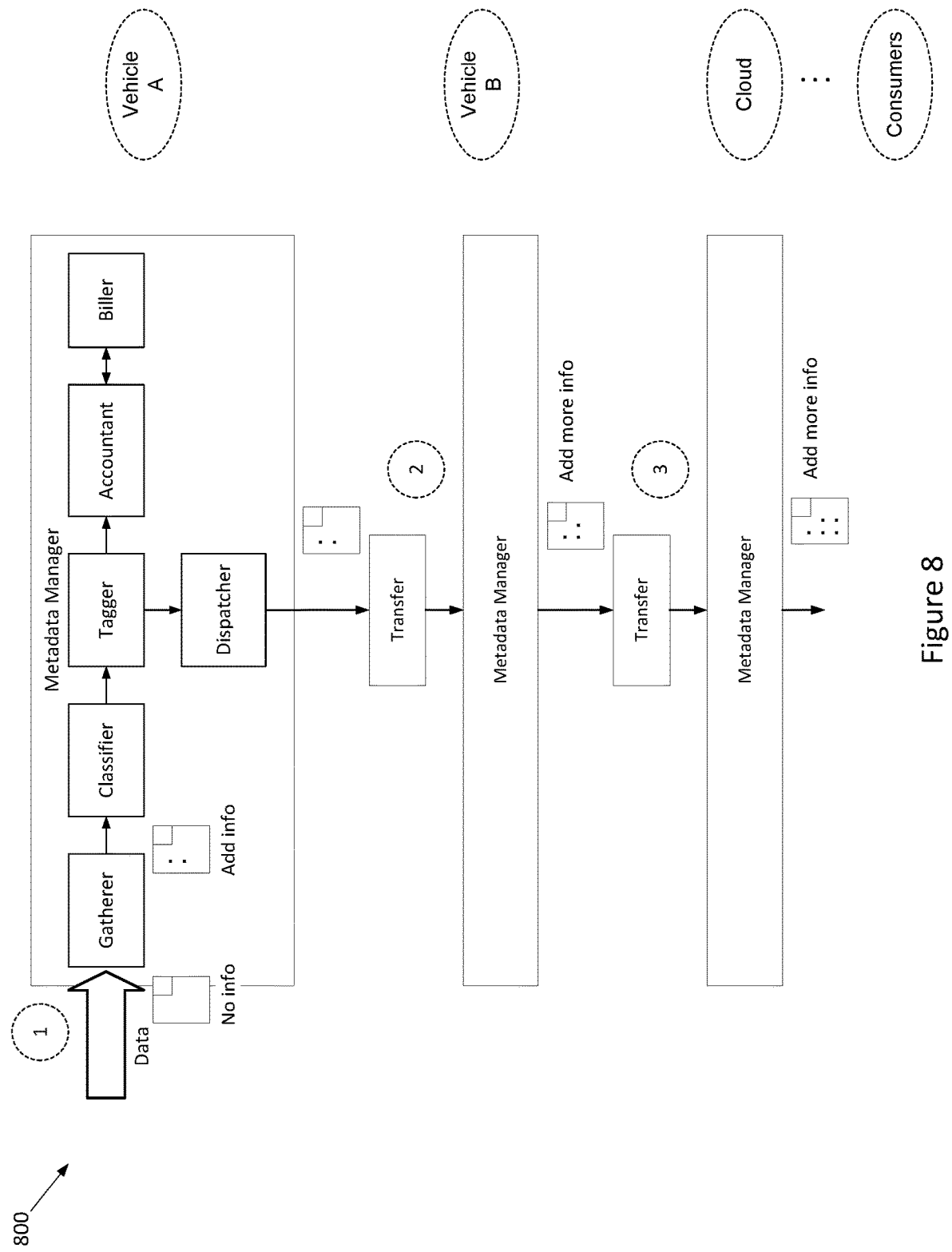
FIG. 8 shows in further detail the example system and method created to support dynamic accounting and billing of the metadata, in accordance with various aspects of this disclosure.

FIG. 8 shows in further detail the example system and method created to support dynamic accounting and billing of the metadata, in accordance with various aspects of this disclosure. Referring to FIG. 8, there is shown a chart 800 illustrating three stages for dynamic accounting and billing: generation, classification and enrichment; accounting; and billing. These three stages are referred to as scenarios 1, 2 and 3. As may be seen in FIG. 8, the metadata manager system is responsible for handling information from gathering the information to billing.

In example scenario 1, an event may trigger the gathering of all the information available and required based on a cost function for a cost effective transfer where the cost function informs the system of the QoS parameters required to meet the specification of the consumer. In the case of this example, the QoS parameters may indicate to consider the most cost effective option available.

The gatherer module is the module responsible for retrieving all available information, such as according to a filter or filtering criteria—e.g., simple rules or heuristics, etc. For example, filtering may be based on vehicle-to-vehicle (V2V) operating mode, which may enable gathering the metadata if the V2V operating mode is active. The filter(s) may be defined in the Global Metadata Manager in the Cloud, in order to create network metadata, communication metadata, system metadata, security metadata, contextual metadata, and user metadata.

The metadata may be classified by the classifier module based on type, communication method used, consumer (application and services), contextual constraints, and conditions.

The tagger module may tag the metadata, such as according to a filter or filtering criteria—e.g., simple rules or heuristics, etc. For example, filtering may be based on a real-time transfer priority filter, which may enable cellular for metadata transfer), timestamp, information that allows it to be easily identifiable, and adds a hash for where it was created and another to identify the consumer.

The metadata may then be sent to the dispatcher module that notifies the system that the metadata is ready to transfer according to a filter or filtering criteria—e.g., simple rules or heuristics, etc. For example, filtering may be based on the cost effective transfer cost function. The accountant module may record all network and system related information in order to process cost and inform billing. The biller module may manage the budget and calculating pricing based on 1) the information sent by the accountant and 2) by the current tax regulations (which may be specific for a particular region, geo-location and/or date and time).

In example scenario 2, as the data moves throughout the Internet of Moving Things, the metadata may be processed by another vehicle's (or network node such as infrastructure device, consumer service or application, or Cloud) metadata manager in order to enrich the metadata throughout its life-cycle and journey to its consumer. The metadata may be processed by the gatherer module that is responsible for adding additional information or enriching already existing metadata. The metadata is then reclassified (if required) and retagged, and sent to the dispatcher module. This process of continuous enrichment through gathering, classifying and tagging, may provide an end to end view of how the data and the system and network were performing throughout all steps.

In example scenario 2, the metadata manager's biller module may be the gateway to the global billing manager in the Cloud. The biller module may have the capability to manage a budget that is defined as a local billing policy received from the Cloud. The budget may allow the gatherer module and dispatcher module to fine tune the filters (e.g., simple rules or heuristics, etc.) based on the global cost function from the Cloud. Depending on the budget and QoS expectations the gatherer module and the dispatcher module may, for the example of a high budget, gather more information, context and data, use more processing time for more complex data crunching without sending that data to the Cloud and back, select a better performing Wi-Fi access point to dispatch metadata, or use another vehicle's available storage.

The biller module may be informed by the accountant module on the cost (network, communication, system and security) of that metadata at each step, and by the interaction with the Tax Database module. The Tax Database module may inform the biller module of the current tax rate based on the type of metadata, the time of day, where the dispatcher begin transferring the data and where it ended. The biller module may then send the bill to the global billing manager to be billed by the customer based on the metadata accountant.

Figure 9:
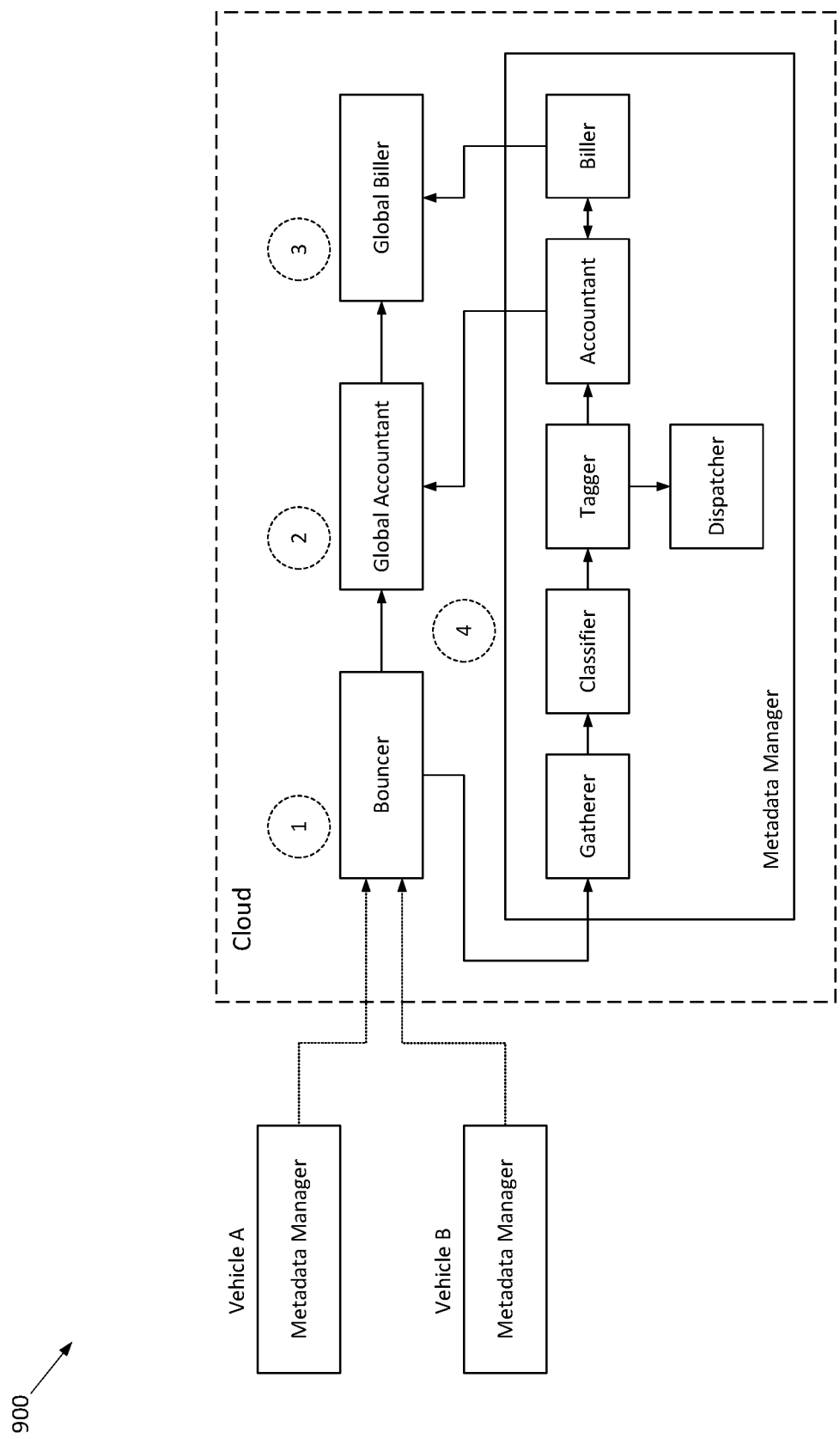
FIG. 9 shows an example Cloud global metadata manager responsible for orchestrating cost, budget and data transfer policies, in accordance with various aspects of this disclosure.

FIG. 9 shows an example Cloud global metadata manager responsible for orchestrating cost, budget and data transfer policies, in accordance with various aspects of this disclosure. Referring to FIG. 9, there is shown a chart 900 illustrating the global management and orchestration of the metadata, its policies, and final billing and accounting happens in the global metadata manager in the Cloud. If the consumer is a Cloud service or application the accounting and billing is handled by the Cloud's Metadata Manager.

A bouncer module may be responsible for authorizing and controlling access to the Global Metadata Manager based on a metadata tag such as, for example, bill-ledger_origin-id_timestamp_access-token, etc. For data transfer between vehicles (V2V) or that do not resort to the Cloud (e.g., V2P), the local biller module may manage the budget based on the global budget policy. While the Global Metadata Manager (GMM) may not mediate V2V or V2P interactions, the GMM may request that the local accountant modules and biller modules send their reports to the Cloud if the reports are not received within the expected delay tolerance.

The value of the metadata may not be solely measured by the cost of transferring that data through the infrastructure. The metadata may provide additional information on the entire context around transferring data that may significantly improve the performance of the networks, the Wi-Fi and cellular provider prioritization, and data transfers.

The global metadata manager may be responsible for monitoring and managing the metadata managers of the vehicles such as, for example, an AV, NAV, etc., ensuring that they have the latest cost functions, data, provider and budget policies in order to make the most optimum connectivity and data transfer decisions.

Various embodiments of the disclosure may dynamically gather, classify, account for, and bill the metadata used to increase and improve system and network performance, and easily manage it from the Cloud towards the goal of informing the billing system of the cost and value of the metadata.

Figure 10:
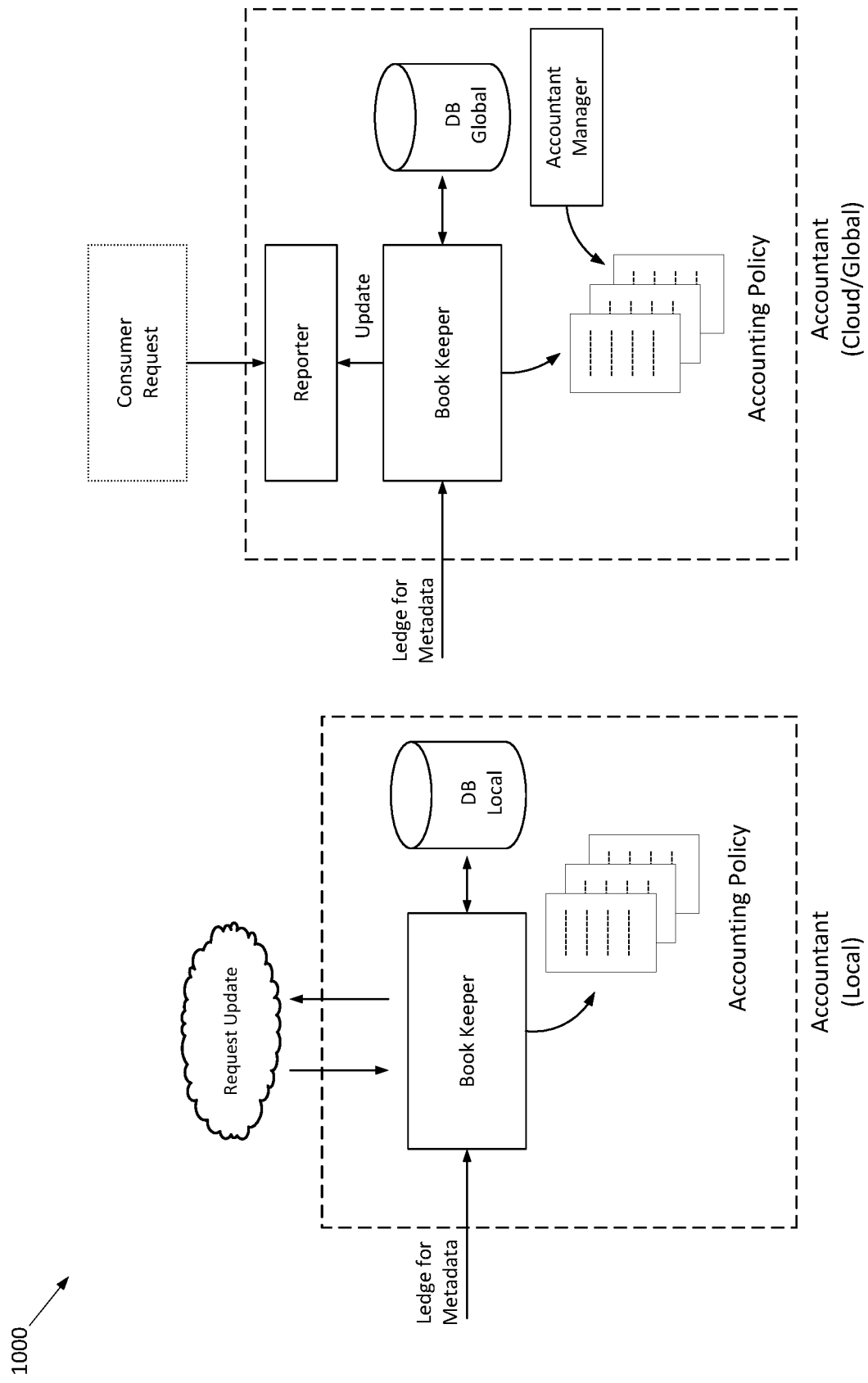
FIG. 10 shows an example of a local accounting mechanism and a Cloud global accounting and management system, in accordance with various aspects of this disclosure.

FIG. 10 shows an example of a local accounting mechanism and a Cloud global accounting and management system, in accordance with various aspects of this disclosure. Referring to FIG. 10, there is shown a chart 1000 illustrating use of accounting mechanism(s). The accounting mechanism may be in the vehicle and/or in the Cloud.

Accounting for metadata locally, for example, by a vehicle, and in the Cloud may use the same methods. The Global Accountant module may, for example, have the reporter module to handle consumer requests and updates.

Metadata Managers may dispatch metadata through two methods: Enriched and Direct. Enriched Dispatching may have the metadata flowing throughout the Internet of Moving Things from generation to consumption from one metadata manager to another adding more information with each iteration (use-case A). Direct dispatching may be event-based and sent directly to the Global Metadata Manager in the Cloud, such as in use-case B in FIG. 9.

Use-case A describes enriching data that is being transferred from origin to consumer when the snapshot of the entire system at a particular moment in time and external context is gathered. The data may be classified based upon, for example, a communication method (V2V (vehicle-to-vehicle), V2I (vehicle-to-infrastructure), V2P (vehicle-to-person), etc.), communication mode (scanning, connecting), consumer (user, application and service) requirements, etc.

The metadata may be tagged with the file hash and consumer hash. The accountant module's bookkeeper may register all the available information. The bookkeeper may recall the correct metadata based on the file hash as it is transferred through the ecosystem, enriching it with all the available information. Accordingly, several snapshots of the entire system may be provided throughout the data lifecycle.

The bookkeeper may follow the accounting policies defined by the global accountant manager in the Cloud, and the bookkeeper may store all the information. The bookkeeper may then keep the global bookkeeper up to date based on the accounting policy defined. The bookkeeper may retrieve specific information based on request from the global bookkeeper. The global accountant may receive and aggregate the information, and validate the effectiveness of the accounting policy used.

Use-case B describes registering a snapshot of the entire system at a particular moment in time and external context (event based) where triggers such as events send a system-wide snapshot for accounting before being dispatched to the consumer. Metadata may be gathered as described above. The data may be classified as based upon Communication method (V2V, V2I, V2P, etc.), Communication mode (scanning, connecting), Consumer (user, application and service) requirements, etc. The metadata may be tagged with the file hash and consumer hash. The bookkeeper may organize the information of each event separately adding a unique identifier to be able to track the sequence of events. The global accountant may receive the information and validate the effectiveness of the accounting policy used.

Control and management of the accounting system may be performed centrally, for example, by the global accountant in the Cloud. The global bookkeeper may aggregate all the accounting performed by the vehicles (e.g., an AV, NAV, etc.), infrastructure, clouds, and consumers. The global bookkeeper may track which accountant modules are sharing their ledgers and are up to date with their accounting policies. The global bookkeeper may track and register the local accountant module usage of their local budgets. The accountant manager may define the global accounting policies to be sent to the local accountants. The global database may contain all accounting ledgers and the reporter may be the interface with the billing system.

Figure 11:
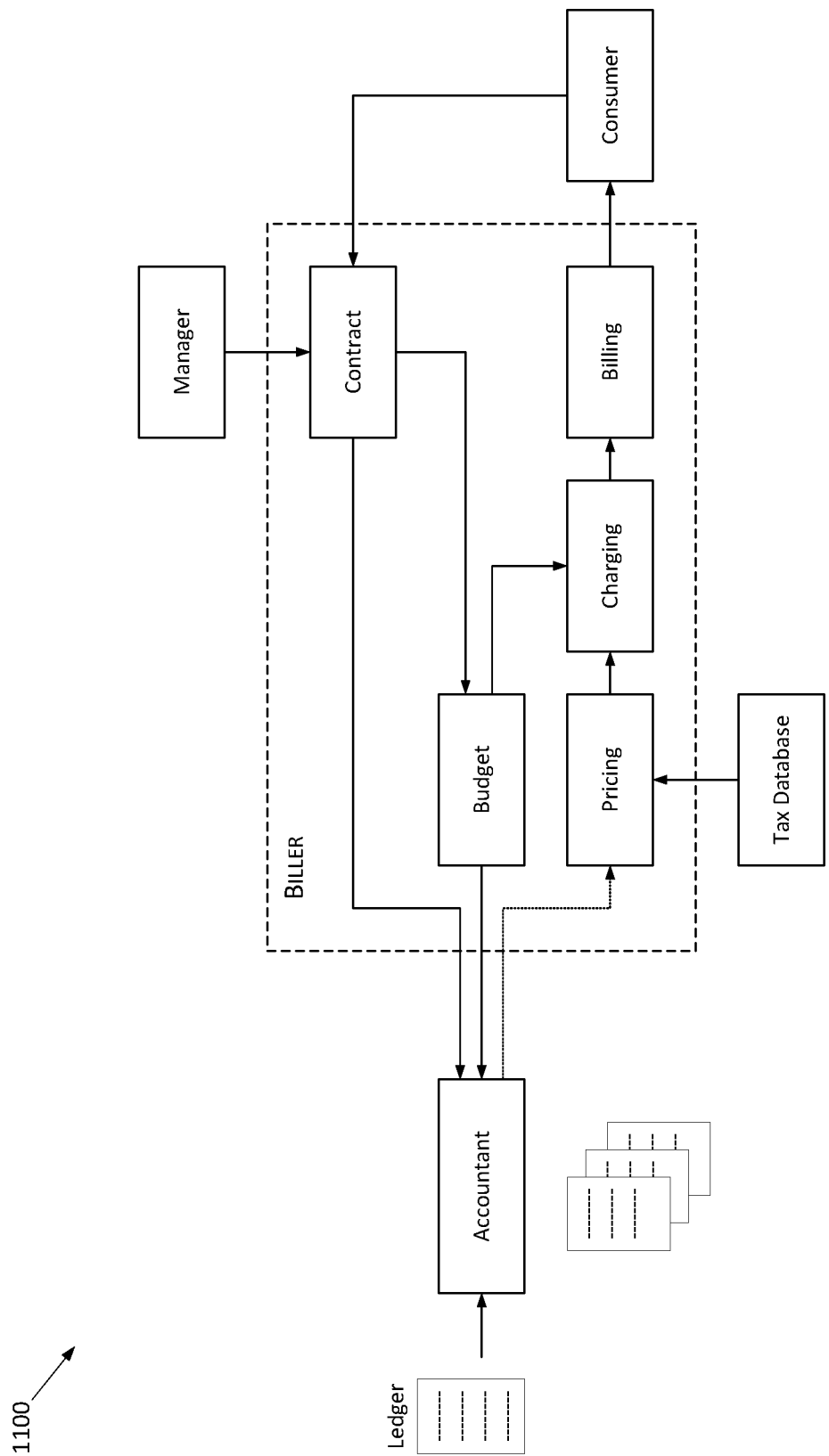
FIG. 11 shows an example biller, in accordance with various aspects of this disclosure.

FIG. 11 shows an example biller, in accordance with various aspects of this disclosure. Referring to FIG. 11, there is shown a billing mechanism 1100 that may be used by a vehicle and the Cloud. The contracts module may provide information to the budget module of the resources available for managing the metadata request, and may provide information to the accountant module of what metadata is required. The biller module may have a bidirectional relationship with the accountant module in which the biller module informs the accountant module of its needs. The biller module informs the budget module of the total resources available.

The budget module informs the accountant module of the amount of resources available. The accountant module informs the pricing module of the cost of the metadata. The biller module informs the accountant module of the current tax rate applied. The pricing module then charges the budget module with that cost and then it is added to an invoice for billing the consumer. Local billing may be managed through two types of contracts: local contracts (as illustrated in FIG. 12) and global contracts (as illustrated in FIG. 13).

Figure 12:
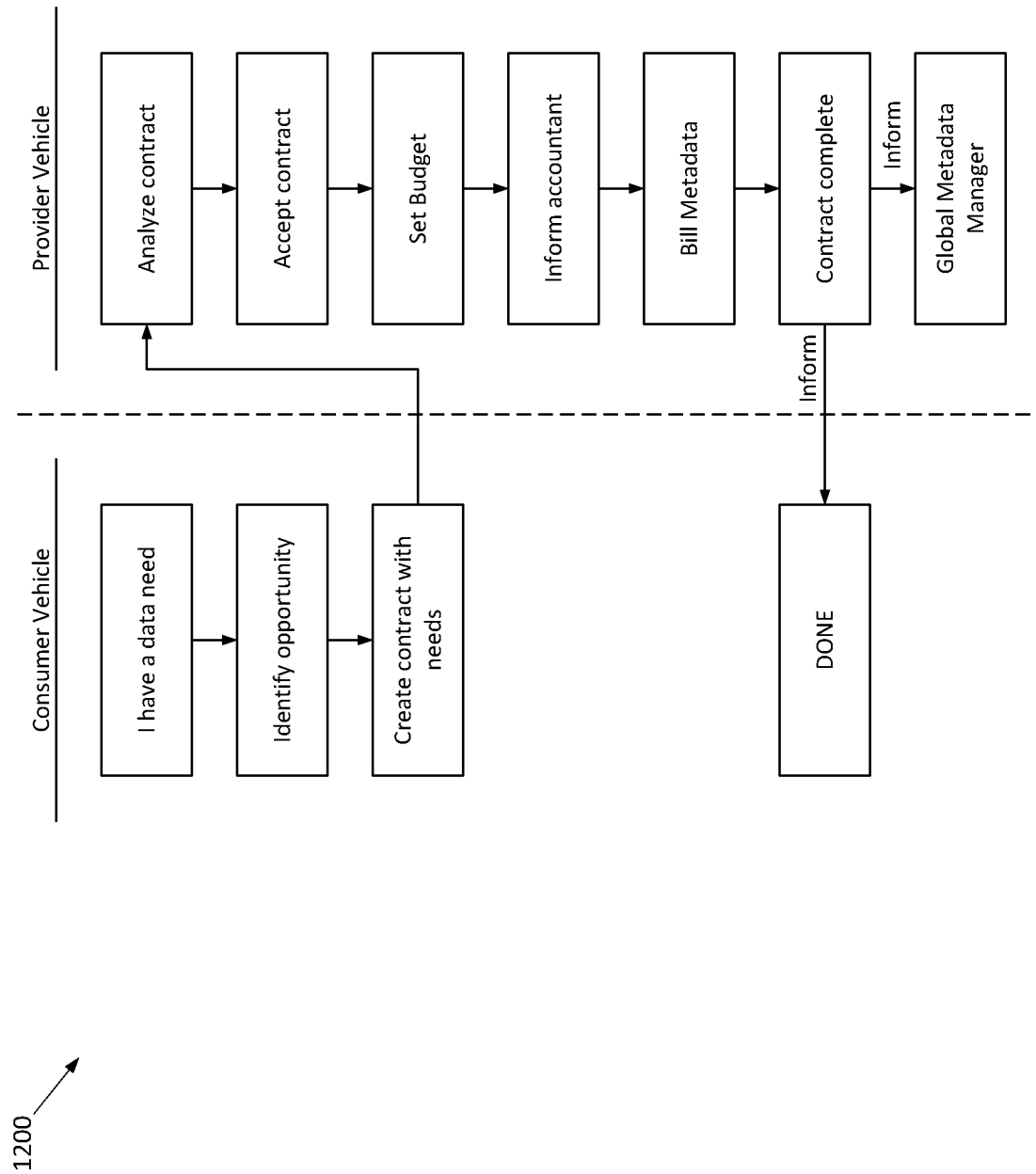
FIG. 12 shows an example interaction of a local ad-hoc contract between a consumer vehicle and a provider vehicle, in accordance with various aspects of this disclosure.
Figure 13:
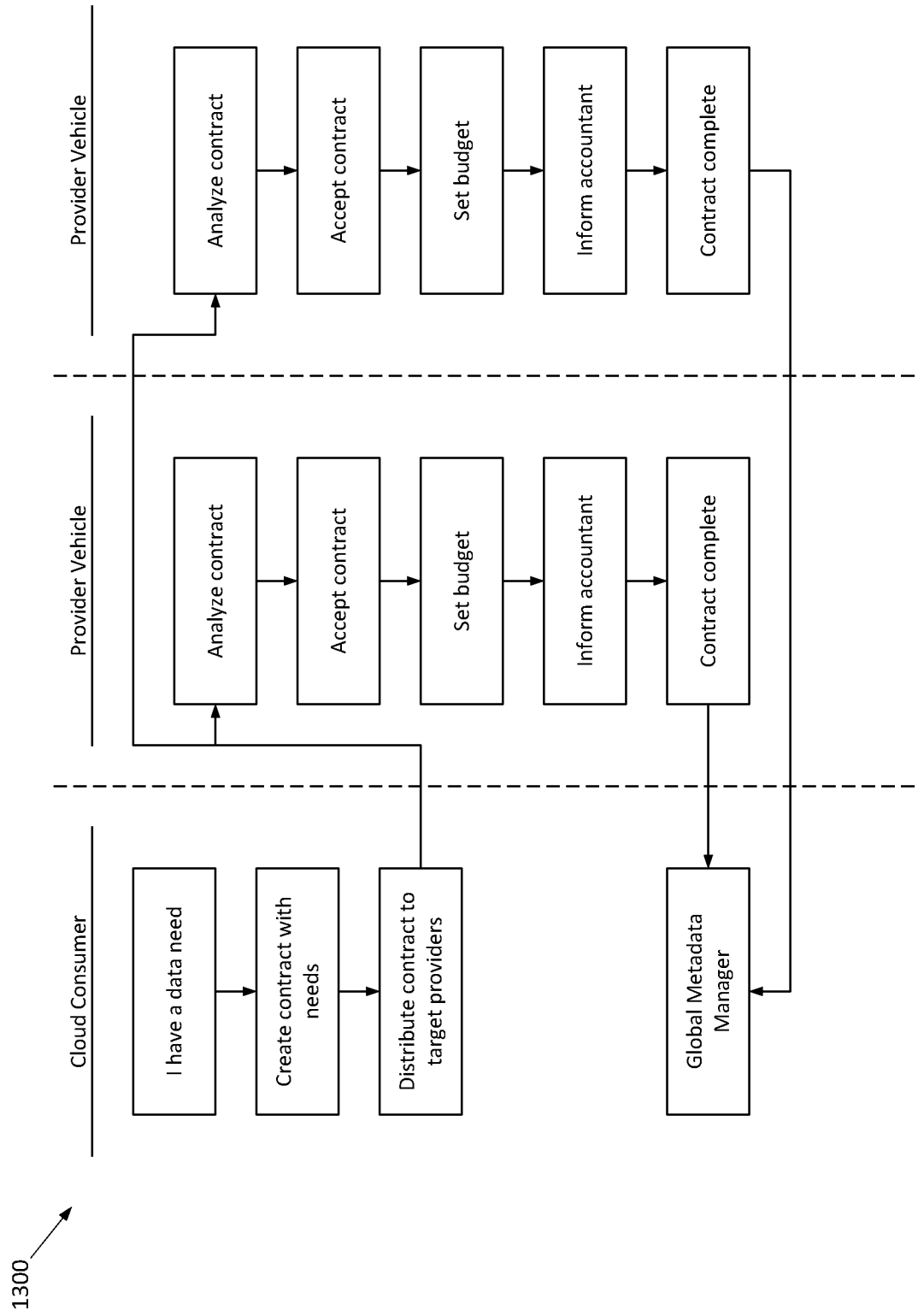
FIG. 13 shows an example contract between the global contract manager and two vehicles, in accordance with various aspects of this disclosure.

FIG. 12 shows an example interaction of a local ad-hoc contract between a consumer vehicle and a provider vehicle, in accordance with various aspects of this disclosure. Referring to FIG. 12, there is shown a chart 1200 illustrating example interaction when creating local ad-hoc contract between a consumer vehicle (left) and a provider vehicle (right). In this regard, local, ad-hoc contracts may be created opportunistically by vehicles (moving things and other devices) to address a specific, local need. An example ad-hoc contract may be, for example, a request for specific V2V network metadata from a passing vehicle.

Opportunistic contract may be made based on needs, for example from a specific vehicle (consumer) to another (provider) or from a person (consumer) to a vehicle (provider). The negotiation may be performed between two contract holders referred to as a consumer (e.g., consumer vehicle) and a provider (e.g., provider vehicle). The consumer may set a cost function (e.g., low latency V2V data transfer) and budget (e.g., a dollar value or computation time or local storage) based on its needs, and adds them to the contract for negotiation with the provider. The provider's accountant module may send to his biller module the ledger created by the consumer that specifies the network metadata, communication metadata, system metadata, security metadata, contextual metadata, and user metadata.

The provider, may charge the consumer based on the contact negotiated between them. The local pricing system may attribute a local cost for obtaining the metadata based on several conditions as well as the external context. The local pricing system may also attribute a tax rate based on the policy defined by the local Tax Database module, which may be, for example, updated by the global Tax Database module. The Tax Database module may inform the biller module of the tax rate to be applied based on, for example, the type of metadata, time of day, the location where the dispatcher began transferring the data, and the location where the data is delivered.

For example, when transferring data while crossing from a first state to a second state, the biller module may account for the amount of data transferred in the first state and in the second state. An appropriate tax rate may then be to be applied to the data transferred in a respective first and second states. When the contract terms or the budget for the provider meets the consumer's specification, then the provider and the consumer may both archive the contract as being fulfilled. Accordingly, the provider no longer gathers metadata, classifies, tags and accounts metadata for the consumer.

FIG. 13 shows an example contract between the global contract manager and two vehicles, in accordance with various aspects of this disclosure. Referring to FIG. 13, there is shown a chart 1300 illustrating example interactions when creating and applying global contract between contract manager (left) and two vehicles (middle and right). In this regard, global contracts may be created in the Cloud by the Global Contract Manager based on consumer needs such as, for example, customer application or service requirements. An example of a global contract may be a request for network and communication metadata to be used to improve Wi-Fi hotspot placement in cities. An example interaction is described below.

The global contract manager may send local contract policies to the vehicles specifying what data is required, the cost function, the budget available, and the metadata pricing baseline. Global contracts may be sent to and used by vehicles that meet the contract requirements. A global contract may be defined in terms of, for example, geography, time of day/day of week, type of data, communication method, communication mode, application and service, external context, network provider, access point/hotspot rating, etc.

Figure 14:
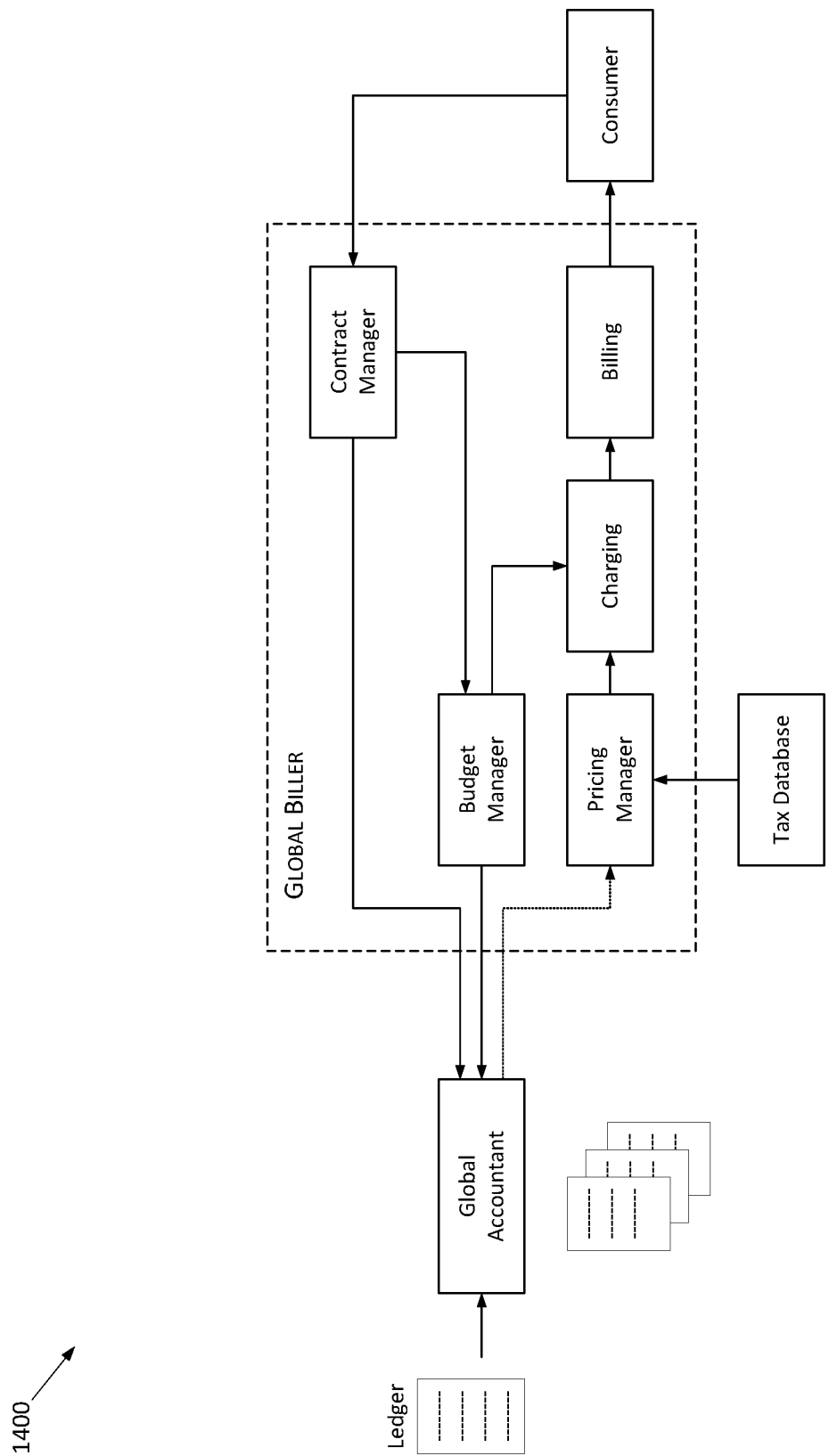
FIG. 14 shows an example global billing system for managing global consumer budgets, managing contracts and billing, in accordance with various aspects of this disclosure.

FIG. 14 shows an example global billing system for managing global consumer budgets, managing contracts and billing, in accordance with various aspects of this disclosure. Referring to FIG. 14, there is shown a global billing mechanism 1400. Different contracts may gather different data for different insights. For example, contracts that request collection of real-time network performance metrics may provide a global city-wide map view of the network performance. Other contracts may gather vehicle speed, location, hotspot rating, and the time to first byte of the connection to determine connection success on streets with high speed traffic.

Various vehicles may follow the defined policies and decide on the most optimum data transfer method available. The biller module may negotiate with consumers a trading contract. This contract may represent the requirements and the trading token, which can be, for example, monetary, storage space, processing capability, other relevant metadata, data offload, multi-hop access to infrastructure, etc.

The tokens may then be evaluated by a vehicle's pricing policy which may then decide on accepting or ignoring the contract. If the contract is accepted the metadata manager prepares the gathering, classification, tagging and accounting of data. The accountant module then specifies the cost for obtaining or meeting the contract requirements based on the system, network, context, user metadata available.

The Global Metadata Biller (GMB) may be similar for the vehicle biller module and the Cloud biller module. The GMB differs in that it may collects and manages the Global Contracts, which may be sent to millions of vehicles, global budgets, and global pricing for millions of vehicles (and other IoMT devices) and reports directly to the customer. The global biller has a bidirectional relationship with the global accountant where the global billing system in the Cloud bills the consumer based on, for example, the budget attributed to each vehicle, and the specific bill from the local biller based on accounting for the specific vehicles.

Figure 15:
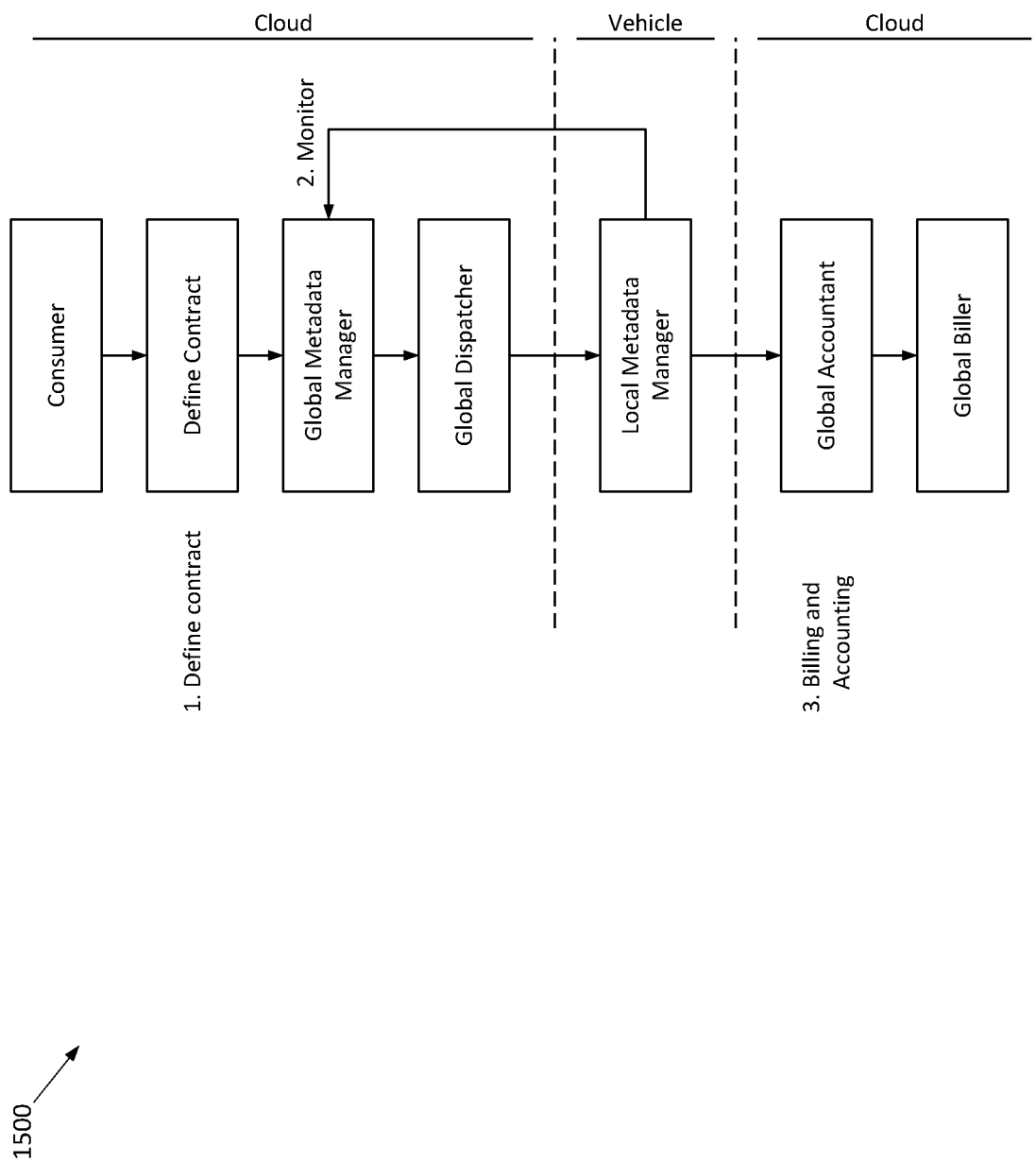
FIG. 15 shows an example use case of a global transaction, in accordance with various aspects of this disclosure.
Figure 16:
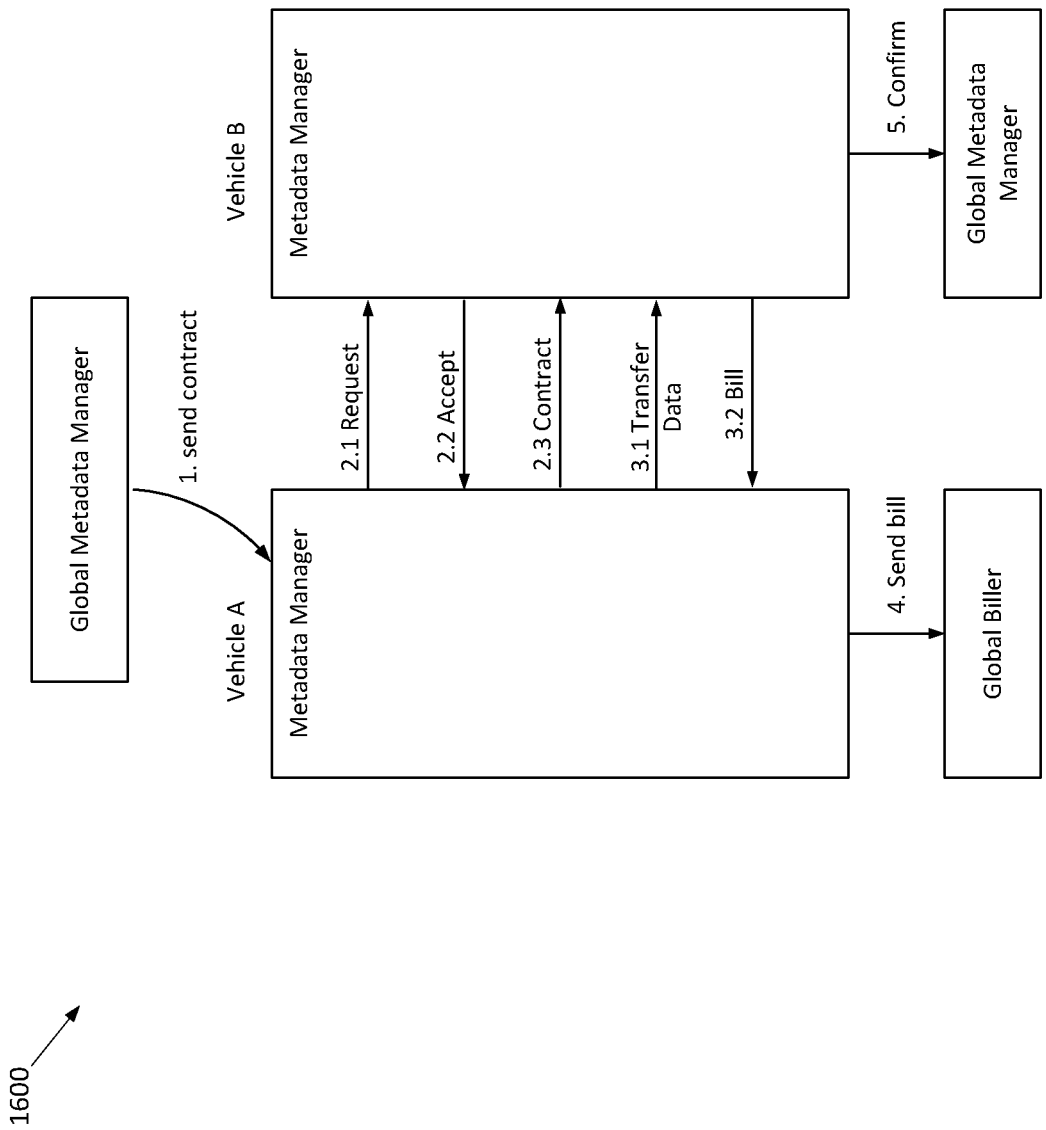
FIG. 16 shows an example use case of a local transaction in vehicle-to-vehicle (V2V) trading scenario, in accordance with various embodiments of the disclosure.

Various embodiments of the disclosure may impact global (e.g., Cloud, multi-mesh and region) and local (e.g., two vehicles) ecosystem levels through the systems and methods defined here within. FIGS. 15 and 16 demonstrate how these systems and methods extract value by allowing for an easy centralized Cloud Global Metadata Manager and the efficiency of ad-hoc transactions with the local Metadata Manager. Provided below are example use-cases for a global (as illustrated in FIG. 15) and local (as illustrated in FIG. 16) metadata transaction from contract to gathering to billing.

FIG. 15 shows an example use case of a global transaction, in accordance with various aspects of this disclosure. Referring to FIG. 15, there is shown a chart 1500 illustrating an example global transaction, such as between a network provider that requests data on its network performance in order to inform where the provider may improve its service. The global transaction may be, for example, a contract defined by a consumer in the Cloud that leverages the metadata of the myriad of vehicles and devices.

The Wi-Fi Provider Management service, which may be referred to as a "consumer," may define the contract requirements in the global metadata manager such as, for example, cost function, budget, pricing baseline, tax rate, type of data, sample frequency, and other data requirements.

The global contract manager, which may be a part of the global metadata manager, may send the budgeting requirements to the budget module, cost functions and other data requirements to the global accountant manager. The global contract manager may also send the contract to the vehicles (targets) that comply with the data requirement policy such as geolocation, etc.

The global accountant manager may send the accounting policies to the vehicles (targets) that comply with the data requirement policy with the data requirement policy. The vehicles (e.g., AVs, NAVs, etc.) may receive the policies and the local metadata managers may immediately begin gathering, classifying, tagging, and accounting the metadata.

The local biller module may evaluate the local budget based on the budget policy defined in the contract so as to not go over budget, and interact with the local tax database module to provide the current tax rate to be applied to the billing.

The consumer may also be able to readily access and monitor the metadata as it arrives to the Cloud portal that may, for example, be dependent on a cost function as "use only Wi-Fi" to limit the opportunities to offload that data.

The global biller module may periodically request the bills from the vehicles (e.g., AVs, NAVs, etc.), and the consumer may be notified of the billing.

FIG. 16 shows an example use case of a local transaction in vehicle-to-vehicle (V2V) trading scenario, in accordance with various embodiments of the disclosure. Referring to FIG. 16, there is shown a chart 1600 illustrating an example local transaction. The local transaction may be, for example, a contract defined by a consumer in the Cloud that leverages the metadata of the myriad of vehicles (e.g., AVs, NAVs, etc.) and devices. This use-case specifies the local decision making and billing between two vehicles (vehicle A and vehicle B). This use case is specific for a scenario where vehicle A may comply with the metadata gathering requirements but not the metadata distribution budget that was defined in the global contract sent by the global metadata manager. This use case may be an extension of the use case presented with respect to FIG. 9 where vehicles may not be able to comply fully with their global contracts and have the ability to leverage other vehicles through local contracts.

A scenario may be, for example, where vehicle A has a global contract policy and may not be able to comply with the requirements. Vehicle A may query vehicle B if vehicle B may comply with vehicle A's open contract. Vehicle B may acknowledge and a new contract may be made between vehicle A and vehicle B.

Vehicle A may offload the appropriate data to vehicle B, and vehicle B may bill vehicle A. Vehicle B may then store and later transfer the data complying with the contract requirements and confirm end of contract with the global metadata manager. Vehicle A may transfer the bill from vehicle B to the global biller for accounting.

Accordingly, the accounting and billing of metadata may be done locally. The accounting and billing of metadata may also be done globally in the Cloud. Billing may consume tokens that may be financial or system-based such as, for example, onboard storage, onboard processing, communication mode, etc.

Management system may control metadata accounting and billing through global policies that are sent to vehicles as local rules. Improved billing may occur for metadata based on several measures including the external context and communication methods and modes. Consumers may be billed for value added services to their applications and services, and not just for data volume. Accordingly, an ability to measure cost and profits for additional revenue streams may be based on data from the Internet of Moving Things (IoMT).

The consumers may be provided with a realistic view of the cost for generating, classifying, tagging, and accounting metadata throughout the IoMT ecosystem. Accordingly, telecommunication, infrastructure, and provider management may be improved based on insights extracted from the metadata. For example, network and communication performance may be improved based on insights extracted from the metadata such as which Wi-Fi provider provides the best coverage and QoS. An Automotive OEM may be able to identify and use a provider that may be performing better than other providers, may have more coverage, and may be more cost effective (Cellular and Wi-Fi provider management).

Resource management may be improved by offloading various tasks such as, for example, data transfer, data storage, data processing, to other vehicle(s) by automating the billing process to manage locally (e.g., Vehicle-to-Vehicle data transfer and enrichment). Data transfer from a moving vehicle may be improved in unfamiliar scenarios by learning from previous experiences that are shared by metadata and the insights processed in the Cloud (Vehicle-to-Cloud data transfer and enrichment). Communication costs may be billed based on system and network cost as well as the cost imposed by the external context (Improved communication billing).

Various embodiments of the disclosure may assign part of the responsibility for accounting and billing metadata to the edge entities. In some cases, inconsistent billing at different localities may be provided based on the local rules. That is, vehicles (e.g., AVs, NAVs, etc.) may receive the policies based on a cost function at different times and, accordingly, the local pricing rule applied to the metadata may be inconsistent with the active policy in the global pricing manager. Accordingly, oversight, monitoring, and updating may assure that the billing is known and consistent at all times.

Figure 17:
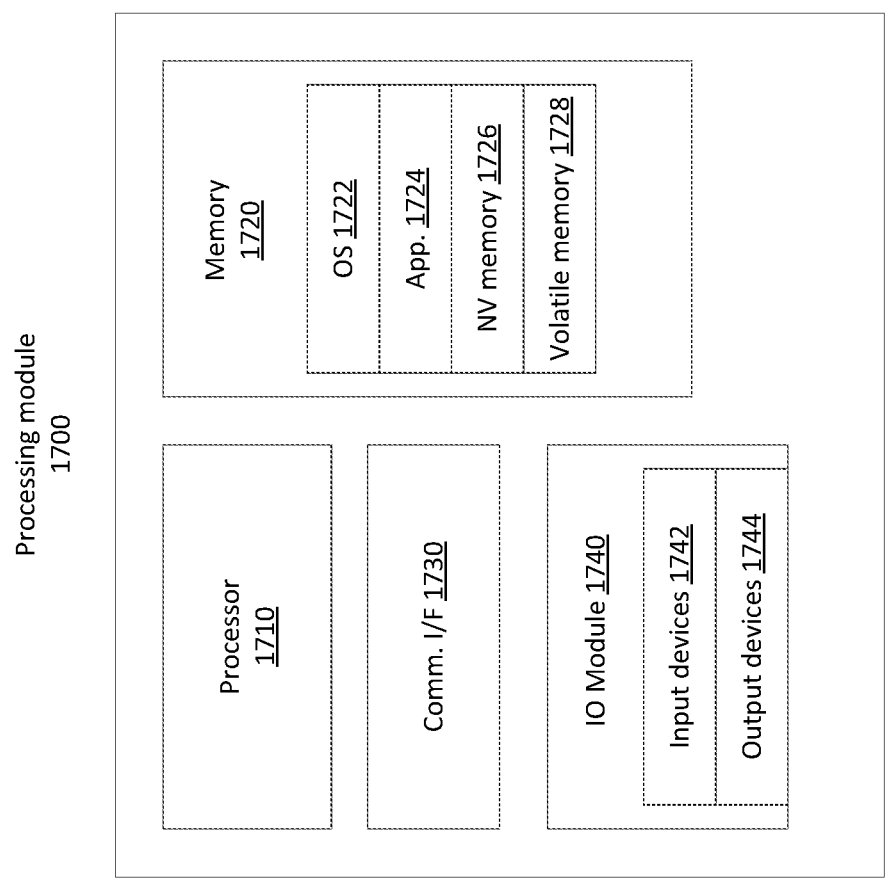
FIG. 17 shows an example block diagram of a processing module that may be used in supporting dynamic accounting and billing of the metadata, in accordance with various aspects of the present disclosure.

FIG. 17 shows an example block diagram of a processing module that may be used in supporting dynamic accounting and billing of the metadata, in accordance with various aspects of the present disclosure. Referring to FIG. 17, there is shown a processing module 1700 that may be present in a FAP, a MAP, a vehicle, or any entity or block described in the present disclosure. The processing module 1700 may be used for one or more of the various functionalities described.

The processing module 1700 may comprise, for example, a processor 1710, memory 1720, a communication interface 1730, and an IO interface 1740. The processing module 1700 may be used, for example, for processing information in an entity (or server). The processing module 1700 may also operate in concert with one or more other processors that may, for example, control at least a portion of a vehicle and/or assist in the operation of a vehicle. The memory 1720 may include non-volatile memory 1726 and volatile memory 1728. The various entities or nodes may use a part of the memory 1720 to store information and/or instructions. The operating system 1722 and applications 1724 may be stored in, for example, the non-volatile memory 1726, and may be copied to volatile memory 1728 for execution. Various embodiments of the disclosure may use different memory architectures that are design and/or implementation dependent.

The communication interface 1730 may allow the processing module 1700 to communicate with other devices via, for example, a wired protocol such as USB, Ethernet, FireWire, etc., or a wireless protocol such as Bluetooth, Near Field Communication (NFC), Wi-Fi, etc. The various types of radios for communication may be referred to as a transceiver for the sake of simplicity. The communication may also be with, for example, with one or more entities, system servers, and/or the Cloud.

The processing module 1700 may also comprise the IO module 1740 for communication with a user via the input devices 1742 and output information to be displayed on output devices 1744. The input devices 1742 may comprise, for example, buttons, touch sensitive screen, which may be a part of a display, a microphone, etc. The output devices 1744 may comprise, for example, the display, a speaker, LEDs, etc.

The processor 1710 may operate using different architectures in different embodiments. For example, the processor 1710 may use the memory 1720 to store instructions to execute, or the processor 1710 may have its own memory (not shown) for its instructions. Furthermore, various embodiments may have the processor 1710 work in concert with other processors in the vehicle (e.g., AV, NAV, etc.) in which the processing module 1700 is located. Various embodiments may also allow any of the processors to work individually.

Various embodiments may use other architectures where the different functionalities may be grouped differently. For example, the grouping may be in different integrated circuit chips. Or the grouping may combine different devices such as the IO module 1740 and the communication interface 1730 together, etc. Additionally, as this is a generic description, a processing module 1700 used by a specific device may not have all components described for the processing module 1700 and/or may have other components not described here.

An example system for handling billing of metadata in a network of moving things, in accordance with the present disclosure, comprises a network node having at least one communication circuit, at least one storage circuit, and at least one processing circuit. The at least one communication circuit is configured to communicate signals for transmission and reception of data. The at least one storage circuit is configured to store instructions and data. The at least one processing circuit is configured to, based at least in part on instructions and/or data stored in the at least one storage circuit, manage billing of the metadata in the network node based on a predefined billing policy, and where the managing comprises: assessing, based on the predefined billing policy, cost for handling the metadata, and managing the handling of the metadata based on the assessing of the cost.

In an example implementation, the at least one processing circuit is configured to obtain at least portion of the predefined billing policy from a Cloud-based network node.

In an example implementation, the at least one processing circuit is configured to determine the cost for handling the metadata.

In an example implementation, the at least one processing circuit is configured to, when determining the cost for handling the metadata: determine one or more needs for the handling of the metadata, determine one or more resources required for meeting each of the one or more needs, and determine cost for utilizing each of the one or more resources.

In an example implementation, the at least one processing circuit is configured to, when managing the handling of the metadata based on the assessing of the cost, generate a bill for handling of the metadata based on the assessing of the cost.

In an example implementation, the at least one processing circuit is configured to, when managing the handling of the metadata based on the assessing of the cost, manage use of resources utilized in handling of the metadata.

In an example implementation, the at least one processing circuit is configured to manage the handling the metadata based on a contract.

In an example implementation, the contract comprises a local contract, and the at least one processing circuit is configured to create the local contract dynamically based on negotiation with another network node requesting a service associated with the metadata.

In an example implementation, the contract comprises a global contract, and the at least one processing circuit is configured to, when handling the metadata based on the global contract, obtain the global contract from a Cloud-based network node.

An example system for handling billing of metadata in a network of moving things, in accordance with the present disclosure, comprises a cloud-based network node having at least one communication circuit, at least one storage circuit, and at least one processing circuit. The at least one communication circuit is configured to communicate signals for transmission and reception of data. The at least one storage circuit is configured to store instructions and data. The at least one processing circuit is configured to, based at least in part on instructions and/or data stored in the at least one storage circuit, provide global management of metadata in the network of moving things, where providing the global management of metadata comprises providing global management of billing of the metadata, and the global management of billing comprises one or both of: defining one or more billing policies for managing billing of metadata in one or more network nodes in the network of moving things, and generating one or more global contracts for managing billing of metadata in conjunction with interactions with or between one or more network nodes in the network of moving things.

In an example implementation, the at least one processing circuit is configured to store, at least using the at least one storage circuit, information relating to the metadata.

In an example implementation, the at least one processing circuit is configured to: receive from the one or more network nodes information relating to metadata, and update information or functions relating to the global management of metadata based on received information.

In an example implementation, the at least one processing circuit is configured to: identify one or more network nodes associated with at least one global contract, generate local contract policies based on a global contract, and send the local contract policies to the identified one or more network nodes.

In an example implementation, the at least one processing circuit is configured to, when generating a global contract: determine one or more needs for handling of the metadata, determine information relating to meeting the one or more needs in one or more network nodes, and generate or modify local contract policies for handling the metadata in the one or more network nodes.

An example method for handling billing of metadata in a network of moving things, in accordance with the present disclosure, comprises providing in a Cloud-based network node, global management of the metadata in the network of moving things, where providing the global management of the metadata comprises providing global management of billing of the metadata, and the global management of billing comprises one or both of: defining one or more billing policies for managing billing of metadata in one or more network nodes in the network of moving things, and generating one or more global contracts for managing billing of metadata in conjunction with interactions with or between the one or more network nodes in the network of moving things, and managing locally in each of the one or more network nodes of the network of moving things billing of the metadata based on a predefined billing policy, where the managing comprises: assessing, based on the predefined billing policy, cost for handling the metadata, and managing the handling of the metadata based on the assessing of the cost.

In an example implementation, the method further comprises determining the cost for handling the metadata.

In an example implementation, the method further comprises, when determining the cost for handling the metadata: determining one or more needs for the handling of the metadata, determining one or more resources required for meeting each of the one or more needs, and determining cost for utilizing each of the one or more resources.

In an example implementation, the method further comprises, when managing the handling of the metadata based on the assessing of the cost, generating a bill for handling of the metadata based on the assessing of the cost.

In an example implementation, the method further comprises, when managing the handling of the metadata based on the assessing of the cost, managing use of resources utilized in handling of the metadata.

In an example implementation, the method further comprises handling the metadata based on a negotiated contract.

In an example implementation, the contract comprises a local contract, and the method further comprises creating the local contract dynamically based on negotiation with another network node requesting a service associated with the metadata.

In an example implementation, the contract comprises a global contract, and the method further comprises obtaining the global contract from the Cloud-based network node.

In an example implementation, the method further comprises, in the Cloud-based network node: identifying the one or more network nodes associated with at least one global contract, generating local contract policies based on a global contract, and sending the local contract policies to the identified the one or more network nodes.

In an example implementation, the method further comprises, when generating a global contract: determining one or more needs for handling of the metadata, determining information relating to meeting the one or more needs in the one or more network nodes, and generating or modifying local contract policies for handling the metadata in the one or more network nodes.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

In accordance with various aspects of this disclosure, examples of the networks and/or components thereof presented herein are provided in U.S. Provisional Patent Application Ser. No. 62/222,192, titled "Communication Network of Moving Things," filed Sep. 22, 2015, which is hereby incorporated herein by reference in its entirety.

In accordance with various aspects of this disclosure, the networks and/or components thereof presented herein are provided with systems and methods for integrating such networks and/or components with other networks and systems, non-limiting examples of which are provided in U.S. Provisional Patent Application Ser. No. 62/221,997, titled "Integrated Communication Network for A Network of Moving Things," filed Sep. 22, 2015, which is hereby incorporated herein by reference in its entirety.

Also, in accordance with various aspects of this disclosure, the networks and/or components thereof presented herein are provided with systems and methods for synchronizing such networks and/or components, non-limiting examples of which are provided in U.S. Provisional Patent Application Ser. No. 62/222,016, titled "Systems and Methods for Synchronizing a Network of Moving Things," filed Sep. 22, 2015, which is hereby incorporated herein by reference in its entirety.

Additionally, in accordance with various aspects of this disclosure, the networks and/or components thereof presented herein are provided with systems and methods for managing such networks and/or components, non-limiting examples of which are provided in U.S. Provisional Patent Application Ser. No. 62/222,042, titled "Systems and Methods for Managing a Network of Moving Things," filed Sep. 22, 2015, which is hereby incorporated herein by reference in its entirety.

Further, in accordance with various aspects of this disclosure, the networks and/or components thereof presented herein are provided with systems and methods for monitoring such networks and/or components, non-limiting examples of which are provided in U.S. Provisional Patent Application Ser. No. 62/222,066, titled "Systems and Methods for Monitoring a Network of Moving Things," filed Sep. 22, 2015, which is hereby incorporated herein by reference in its entirety.

Still further, in accordance with various aspects of this disclosure, the networks and/or components thereof presented herein are provided with systems and methods for detecting and/or classifying anomalies in such networks and/or components, non-limiting examples of which are provided in U.S. Provisional Patent Application Ser. No. 62/222,077, titled "Systems and Methods for Detecting and Classifying Anomalies in a Network of Moving Things," filed Sep. 22, 2015, which is hereby incorporated herein by reference in its entirety.

Yet further, in accordance with various aspects of this disclosure, the networks and/or components thereof presented herein are provided with systems and methods for managing mobility in such networks and/or components, non-limiting examples of which are provided in U.S. Provisional Patent Application Ser. No. 62/222,098, titled "Systems and Methods for Managing Mobility in a Network of Moving Things," filed Sep. 22, 2015, which is hereby incorporated herein by reference in its entirety.

Also, in accordance with various aspects of this disclosure, the networks and/or components thereof presented herein are provided with systems and methods for managing connectivity in such networks and/or components, non-limiting examples of which are provided in U.S. Provisional Patent Application Ser. No. 62/222,121, titled "Systems and Methods for Managing Connectivity a Network of Moving Things," filed Sep. 22, 2015, which is hereby incorporated herein by reference in its entirety.

Additionally, in accordance with various aspects of this disclosure, the networks and/or components thereof presented herein are provided with systems and methods for collecting sensor data in such networks and/or components, non-limiting examples of which are provided in U.S. Provisional Patent Application Ser. No. 62/222,135, titled "Systems and Methods for Collecting Sensor Data in a Network of Moving Things," filed Sep. 22, 2015, which is hereby incorporated herein by reference in its entirety.

Further, in accordance with various aspects of this disclosure, the networks and/or components thereof presented herein are provided with systems and methods for interfacing with such networks and/or components, non-limiting examples of which are provided in U.S. Provisional Patent Application Ser. No. 62/222,145, titled "Systems and Methods for Interfacing with a Network of Moving Things," filed Sep. 22, 2015, which is hereby incorporated herein by reference in its entirety.

Still further, in accordance with various aspects of this disclosure, the networks and/or components thereof presented herein are provided with systems and methods for interfacing with a user of such networks and/or components, non-limiting examples of which are provided in U.S. Provisional Patent Application Ser. No. 62/222,150, titled "Systems and Methods for Interfacing with a User of a Network of Moving Things," filed Sep. 22, 2015, which is hereby incorporated herein by reference in its entirety.

Yet further, in accordance with various aspects of this disclosure, the networks and/or components thereof presented herein are provided with systems and methods for data storage and processing in such networks and/or components, non-limiting examples of which are provided in U.S. Provisional Patent Application Ser. No. 62/222,168, titled "Systems and Methods for Data Storage and Processing for a Network of Moving Things," filed Sep. 22, 2015, which is hereby incorporated herein by reference in its entirety.

Also, in accordance with various aspects of this disclosure, the networks and/or components thereof presented herein are provided with systems and methods for vehicle traffic management in such networks and/or components, non-limiting examples of which are provided in U.S. Provisional Patent Application Ser. No. 62/222,183, titled "Systems and Methods for Vehicle Traffic Management in a Network of Moving Things," filed Sep. 22, 2015, which is hereby incorporated herein by reference in its entirety.

Additionally, in accordance with various aspects of this disclosure, the networks and/or components thereof presented herein are provided with systems and methods for environmental management in such networks and/or components, non-limiting examples of which are provided in U.S. Provisional Patent Application Ser. No. 62/222,186, titled "Systems and Methods for Environmental Management in a Network of Moving Things," filed Sep. 22, 2015, which is hereby incorporated herein by reference in its entirety.

Further, in accordance with various aspects of this disclosure, the networks and/or components thereof presented herein are provided with systems and methods for managing port or shipping operation in such networks and/or components, non-limiting examples of which are provided in U.S. Provisional Patent Application Ser. No. 62/222,190, titled "Systems and Methods for Port Management in a Network of Moving Things," filed Sep. 22, 2015, which is hereby incorporated herein by reference in its entirety.

Also, in accordance with various aspects of this disclosure, the networks and/or components thereof presented herein are provided with systems and methods for enhancing the accuracy of positioning or location information based at least in part on historical data, non-limiting examples of which are provided in U.S. Provisional Patent Application Ser. No. 62/244,828, titled "Utilizing Historical Data to Correct GPS Data in a Network of Moving Things," filed Oct. 22, 2015, which is hereby incorporated herein by reference in its entirety.

Additionally, in accordance with various aspects of this disclosure, the networks and/or components thereof presented herein are provided with systems and methods for enhancing the accuracy of position or location of positioning or location information based at least in part on the utilization of anchors, non-limiting examples of which are provided in U.S. Provisional Patent Application Ser. No. 62/244,930, titled "Using Anchors to Correct GPS Data in a Network of Moving Things," filed Oct. 22, 2015, which is hereby incorporated herein by reference in its entirety.

Further, in accordance with various aspects of this disclosure, the networks and/or components thereof presented herein are provided with systems and methods for providing communication between applications, non-limiting examples of which are provided in U.S. Provisional Patent Application Ser. No. 62/246,368, titled "Systems and Methods for Inter-Application Communication in a Network of Moving Things," filed Oct. 26, 2015, which is hereby incorporated herein by reference in its entirety.

Still further, in accordance with various aspects of this disclosure, the networks and/or components thereof presented herein are provided with systems and methods for probing, analyzing and/or validating communication, non-limiting examples of which are provided in U.S. Provisional Patent Application Ser. No. 62/246,372, titled "Systems and Methods for Probing and Validating Communication in a Network of Moving Things," filed Oct. 26, 2015, which is hereby incorporated herein by reference in its entirety.

Yet further, in accordance with various aspects of this disclosure, the networks and/or components thereof presented herein are provided with systems and methods for adapting communication rate, non-limiting examples of which are provided in U.S. Provisional Patent Application Ser. No. 62/250,544, titled "Adaptive Rate Control for Vehicular Networks," filed Nov. 4, 2015, which is hereby incorporated herein by reference in its entirety.

Also, in accordance with various aspects of this disclosure, the networks and/or components thereof presented herein are provided with systems and methods for reconfiguring and adapting hardware, non-limiting examples of which are provided in U.S. Provisional Patent Application Ser. No. 62/273,878, titled "Systems and Methods for Reconfiguring and Adapting Hardware in a Network of Moving Things," filed Dec. 31, 2015, which is hereby incorporated herein by reference in its entirety.

Additionally, in accordance with various aspects of this disclosure, the networks and/or components thereof presented herein are provided with systems and methods for optimizing the gathering of data, non-limiting examples of which are provided in U.S. Provisional Patent Application Ser. No. 62/253,249, titled "Systems and Methods for Optimizing Data Gathering in a Network of Moving Things," filed Nov. 10, 2015, which is hereby incorporated herein by reference in its entirety.

Further, in accordance with various aspects of this disclosure, the networks and/or components thereof presented herein are provided with systems and methods for performing delay tolerant networking, non-limiting examples of which are provided in U.S. Provisional Patent Application Ser. No. 62/257,421, titled "Systems and Methods for Delay Tolerant Networking in a Network of Moving Things," filed Nov. 19, 2015, which is hereby incorporated herein by reference in its entirety.

Still further, in accordance with various aspects of this disclosure, the networks and/or components thereof presented herein are provided with systems and methods for improving the coverage and throughput of mobile access points, non-limiting examples of which are provided in U.S. Provisional Patent Application Ser. No. 62/265,267, titled "Systems and Methods for Improving Coverage and Throughput of Mobile Access Points in a Network of Moving Things," filed Dec. 9, 2015, which is hereby incorporated herein by reference in its entirety.

Yet further, in accordance with various aspects of this disclosure, the networks and/or components thereof presented herein are provided with systems and methods for coordinating channel utilization, non-limiting examples of which are provided in U.S. Provisional Patent Application Ser. No. 62/270,858, titled "Channel Coordination in a Network of Moving Things," filed Dec. 22, 2015, which is hereby incorporated herein by reference in its entirety.

Also, in accordance with various aspects of this disclosure, the networks and/or components thereof presented herein are provided with systems and methods for implementing a network coded mesh network in the network of moving things, non-limiting examples of which are provided in U.S. Provisional Patent Application Ser. No. 62/257,854, titled "Systems and Methods for Network Coded Mesh Networking in a Network of Moving Things," filed Nov. 20, 2015, which is hereby incorporated herein by reference in its entirety.

Additionally, in accordance with various aspects of this disclosure, the networks and/or components thereof presented herein are provided with systems and methods for improving the coverage of fixed access points, non-limiting examples of which are provided in U.S. Provisional Patent Application Ser. No. 62/260,749, titled "Systems and Methods for Improving Fixed Access Point Coverage in a Network of Moving Things," filed Nov. 30, 2015, which is hereby incorporated herein by reference in its entirety.

Further, in accordance with various aspects of this disclosure, the networks and/or components thereof presented herein are provided with systems and methods for managing mobility controllers and their network interactions, non-limiting examples of which are provided in U.S. Provisional Patent Application Ser. No. 62/273,715, titled "Systems and Methods for Managing Mobility Controllers and Their Network Interactions in a Network of Moving Things," filed Dec. 31, 2015, which is hereby incorporated herein by reference in its entirety.

Still further, in accordance with various aspects of this disclosure, the networks and/or components thereof presented herein are provided with systems and methods for managing and/or triggering handovers of mobile access points, non-limiting examples of which are provided in U.S. Provisional Patent Application Ser. No. 62/281,432, titled "Systems and Methods for Managing and Triggering Handovers of Mobile Access Points in a Network of Moving Things," filed Jan. 21, 2016, which is hereby incorporated herein by reference in its entirety.

Yet further, in accordance with various aspects of this disclosure, the networks and/or components thereof presented herein are provided with systems and methods for performing captive portal-related control and management, non-limiting examples of which are provided in U.S. Provisional Patent Application Ser. No. 62/268,188, titled "Captive Portal-related Control and Management in a Network of Moving Things," filed Dec. 16, 2015, which is hereby incorporated herein by reference in its entirety.

Also, in accordance with various aspects of this disclosure, the networks and/or components thereof presented herein are provided with systems and methods for extrapolating high-value data, non-limiting examples of which are provided in U.S. Provisional Patent Application Ser. No. 62/270,678, titled "Systems and Methods to Extrapolate High-Value Data from a Network of Moving Things," filed Dec. 22, 2015, which is hereby incorporated herein by reference in its entirety.

Additionally, in accordance with various aspects of this disclosure, the networks and/or components thereof presented herein are provided with systems and methods for providing remote software updating and distribution, non-limiting examples of which are provided in U.S. Provisional Patent Application Ser. No. 62/272,750, titled "Systems and Methods for Remote Software Update and Distribution in a Network of Moving Things," filed Dec. 30, 2015, which is hereby incorporated herein by reference in its entirety.

Further, in accordance with various aspects of this disclosure, the networks and/or components thereof presented herein are provided with systems and methods for providing remote configuration updating and distribution, non-limiting examples of which are provided in U.S. Provisional Patent Application Ser. No. 62/278,662, titled "Systems and Methods for Remote Configuration Update and Distribution in a Network of Moving Things," filed Jan. 14, 2016, which is hereby incorporated herein by reference in its entirety.

Still further, in accordance with various aspects of this disclosure, the networks and/or components thereof presented herein are provided with systems and methods for adapting the network, for example automatically, based on user feedback, non-limiting examples of which are provided in U.S. Provisional Patent Application Ser. No. 62/286,243, titled "Systems and Methods for Adapting a Network of Moving Things Based on User Feedback," filed Jan. 22, 2016, which is hereby incorporated herein by reference in its entirety.

Yet further, in accordance with various aspects of this disclosure, the networks and/or components thereof presented herein are provided with systems and methods for enhancing and/or guaranteeing data integrity when building or performing data analytics, non-limiting examples of which are provided in U.S. Provisional Patent Application Ser. No. 62/278,764, titled "Systems and Methods to Guarantee Data Integrity When Building Data Analytics in a Network of Moving Things," Jan. 14, 2016, which is hereby incorporated herein by reference in its entirety.

Also, in accordance with various aspects of this disclosure, the networks and/or components thereof presented herein are provided with systems and methods for performing self-initialization and/or automated bootstrapping of mobile access points, non-limiting examples of which are provided in U.S. Provisional Patent Application Ser. No. 62/286,515, titled "Systems and Methods for Self-Initialization and Automated Bootstrapping of Mobile Access Points in a Network of Moving Things," filed Jan. 25, 2016, which is hereby incorporated herein by reference in its entirety.

Additionally, in accordance with various aspects of this disclosure, the networks and/or components thereof presented herein are provided with systems and methods for managing power supply and/or utilization, non-limiting examples of which are provided in U.S. Provisional Patent Application Ser. No. 62/295,602, titled "Systems and Methods for Power Management in a Network of Moving Things," filed Feb. 16, 2016, which is hereby incorporated herein by reference in its entirety.

Further, in accordance with various aspects of this disclosure, the networks and/or components thereof presented herein are provided with systems and methods for automating and easing the installation and setup of the infrastructure, non-limiting examples of which are provided in U.S. Provisional Patent Application Ser. No. 62/299,269, titled "Systems and Methods for Automating and Easing the Installation and Setup of the Infrastructure Supporting a Network of Moving Things," filed Feb. 24, 2016, which is hereby incorporated herein by reference in its entirety.

Further, in accordance with various aspects of this disclosure, the networks and/or components thereof presented herein are provided with systems and methods for dynamic management and control of multiple Wi-Fi radios, non-limiting examples of which are provided in U.S. patent application Ser. No. 16/829,262, filed Mar. 25, 2020, which is hereby incorporated herein by reference in its entirety.

Further, in accordance with various aspects of this disclosure, the networks and/or components thereof presented herein are provided with systems and methods for dynamic and automatic connection to Wi-Fi access points using multiple authentication and operation modes, non-limiting examples of which are provided in U.S. patent application Ser. No. 16/891,668, on Jun. 3, 2020, which is hereby incorporated herein by reference in its entirety.

Further, in accordance with various aspects of this disclosure, the networks and/or components thereof presented herein are provided with systems and methods for intelligent offloading of traffic to public and private Wi-Fi hotspots leveraging the Cloud, non-limiting examples of which are provided in U.S. Provisional patent application Ser. No. 16/905,061, filed Jun. 18, 2020, which is hereby incorporated herein by reference in its entirety.

Further, in accordance with various aspects of this disclosure, the networks and/or components thereof presented herein are provided with systems and methods for Cloud-based data-driven Wi-Fi connectivity management in a network of moving things including, for example, autonomous vehicles, non-limiting examples of which are provided in U.S. patent application Ser. No. 16/984,933, filed Aug. 4, 2020, which is hereby incorporated herein by reference in its entirety.

Further, in accordance with various aspects of this disclosure, the networks and/or components thereof presented herein are provided with systems and methods for adaptive and dynamic Wi-Fi scanning policies in a network of moving things including, for example, autonomous vehicles, non-limiting examples of which are provided in U.S. patent application Ser. No. 16/984,953, filed Aug. 4, 2020, which is hereby incorporated herein by reference in its entirety.

In summary, various aspects of this disclosure provide communication network architectures, systems and methods for supporting a network of mobile nodes, for example comprising a combination of mobile and stationary nodes. As a non-limiting example, various aspects of this disclosure provide communication network architectures, systems, and methods for supporting a dynamically configurable communication network comprising a complex array of both static and moving communication nodes (e.g., the Internet of moving things). While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

What is claimed is:

1. A system configured for handling billing of metadata in a network of moving things, the system comprising:
    a network node comprising:
        at least one communication circuit configured to communicate signals for transmission and reception of data;
        at least one storage circuit configured to store instructions and data; and
        at least one processing circuit configured to, based on at least in part instructions and/or data stored in the at least one storage circuit, manage billing of the metadata in the network node based on a predefined billing policy, wherein the managing comprises:
            assessing, based on the predefined billing policy, cost for handling the metadata, wherein the assessing comprises determining a budget for handling the metadata based on resources of a network node and requirements relating to or associated with handling the metadata; and managing the handling of the metadata based on the assessing of the cost, wherein:
the managing comprises applying one or more actions relating to the metadata;
the one or more actions comprise gathering of information relating to the metadata, classifying the metadata, tagging the metadata, and/or dispatching the metadata; and
at least one action has corresponding filtering criteria for controlling applying of the at least one action.

2. The system of claim 1, wherein the at least one processing circuit is configured to obtain at least portion of the predefined billing policy from a Cloud-based network node.

3. The system of claim 1, wherein the at least one processing circuit is configured to determine the cost for handling the metadata.

4. The system of claim 3, wherein the at least one processing circuit is configured to, when determining the cost for handling the metadata:
determine one or more needs for the handling of the metadata;
determine one or more resources required for meeting each of the one or more needs; and
determine cost for utilizing each of the one or more resources.

5. The system of claim 1, wherein the at least one processing circuit is configured to, when managing the handling of the metadata based on the assessing of the cost, generate a bill for handling of the metadata based on the assessing of the cost.

6. The system of claim 1, wherein the at least one processing circuit is configured to, when managing the handling of the metadata based on the assessing of the cost, manage use of resources utilized in handling of the metadata.

7. The system of claim 1, wherein the at least one processing circuit is configured to manage the handling the metadata based on a contract.

8. The system of claim 7, wherein the contract comprises a local contract, and wherein the at least one processing circuit is configured to create the local contract dynamically based on negotiation with another network node requesting a service associated with the metadata.

9. The system of claim 7, wherein the contract comprises a global contract, and wherein the at least one processing circuit is configured to, when handling the metadata based on the global contract obtain the global contract from a Cloud-based network node.

10. A system configured for handling billing of metadata in a network of moving things, the system comprising:
a Cloud-based network node comprising:
at least one communication circuit configured to communicate signals for transmission and reception of data;
at least one storage circuit configured to store instructions and data; and
at least one processing circuit configured to, based on at least in part instructions and/or data stored in the at least one storage circuit, provide global management of metadata in the network of moving things, wherein providing the global management of metadata comprises:
providing global management of billing of the metadata; and
updating information or functions relating to the global management of metadata based on use of metadata in the network of moving things;
wherein the global management of billing comprises:
defining one or more billing policies for managing billing of metadata in one or more network nodes in the network of moving things; and
generating one or more global contracts for managing billing of metadata in conjunction with interactions with or between one or more network nodes in the network of moving things.

11. The system of claim 10, wherein the at least one processing circuit is configured to store, at least using the at least one storage circuit, information relating to the metadata.

12. The system of claim 10, wherein the at least one processing circuit is configured to:
receive from the one or more network nodes information relating to metadata; and
update the information or functions relating to the global management of metadata based on received information.

13. The system of claim 10, wherein the at least one processing circuit is configured to:
identify one or more network nodes associated with at least one global contract;
generate local contract policies based on a global contract; and
send the local contract policies to the identified one or more network nodes.

14. The system of claim 10, wherein the at least one processing circuit is configured to, when generating a global contract:
determine one or more needs for handling of the metadata;
determine information relating to meeting the one or more needs in one or more network nodes; and
generate or modify local contract policies for handling the metadata in the one or more network nodes.

15. A method for handling billing of metadata in a network of moving things, the system comprising:
providing in a Cloud-based network node, global management of the metadata in the network of moving things, wherein:
providing the global management of the metadata comprises providing global management of billing of the metadata; and
the global management of billing comprises one or both of:
defining one or more billing policies for managing billing of metadata in one or more network nodes in the network of moving things; and
generating one or more global contracts for managing billing of metadata in conjunction with interactions with or between the one or more network nodes in the network of moving things; and
managing locally in each of the one or more network nodes of the network of moving things billing of the metadata based on a predefined billing policy, wherein the managing comprises:
assessing, based on the predefined billing policy, cost for handling the metadata, wherein the assessing comprises determining a budget for handling the metadata based on resources of a network node and requirements relating to or associated with handling the metadata; and managing the handling of the metadata based on the assessing of the cost, wherein:
    the managing comprises applying one or more actions relating to the metadata;
    the one or more actions comprise gathering of information relating to the metadata, classifying the metadata, tagging the metadata, and/or dispatching the metadata; and
    at least one action has corresponding filtering criteria for controlling applying of the at least one action.

16. The method of claim 15, further comprising determining the cost for handling the metadata.

17. The method of claim 16, further comprising, when determining the cost for handling the metadata:
    determining one or more needs for the handling of the metadata;
    determining one or more resources required for meeting each of the one or more needs; and
    determining cost for utilizing each of the one or more resources.

18. The method of claim 15, further comprising, when managing the handling of the metadata based on the assessing of the cost, generating a bill for handling of the metadata based on the assessing of the cost.

19. The method of claim 15, further comprising, when managing the handling of the metadata based on the assessing of the cost, managing use of resources utilized in handling of the metadata.

20. The method of claim 15, further comprising handling the metadata based on a negotiated contract.

21. The method of claim 20, wherein the contract comprises a local contract, and further comprising creating the local contract dynamically based on negotiation with another network node requesting a service associated with the metadata.

22. The method of claim 20, wherein the contract comprises a global contract, and further comprising obtaining the global contract from the Cloud-based network node.

23. The method of claim 15, further comprising, in the Cloud-based network node:
    identifying the one or more network nodes associated with at least one global contract;
    generating local contract policies based on a global contract; and
    sending the local contract policies to the identified the one or more network nodes.

24. The method of claim 15, further comprising, when generating a global contract:
    determining one or more needs for handling of the metadata;
    determining information relating to meeting the one or more needs in the one or more network nodes; and
    generating or modifying local contract policies for handling the metadata in the one or more network nodes.

* * * * *